United States Patent
Lin et al.

(10) Patent No.: US 9,110,526 B2
(45) Date of Patent: Aug. 18, 2015

(54) DRIVING METHOD FOR TOUCH PANEL AND TOUCH-SENSING DEVICE USING THE SAME

(71) Applicant: Acer Incorporated, New Taipei (TW)

(72) Inventors: Yung-Jen Lin, New Taipei (TW); Chao-Shih Huang, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 204 days.

(21) Appl. No.: 13/681,432

(22) Filed: Nov. 20, 2012

(65) Prior Publication Data

US 2013/0321294 A1 Dec. 5, 2013

(30) Foreign Application Priority Data

Jun. 5, 2012 (TW) .............................. 101120152 A

(51) Int. Cl.
G06F 3/041 (2006.01)
G06F 3/044 (2006.01)

(52) U.S. Cl.
CPC ................ G06F 3/041 (2013.01); G06F 3/044 (2013.01); G06F 3/0416 (2013.01)

(58) Field of Classification Search
CPC .............................. G06F 3/041; G06F 3/0412
USPC .......................................... 345/156, 173–178
See application file for complete search history.

(56) References Cited

U.S. PATENT DOCUMENTS

| 8,487,198 B2 * | 7/2013 | Liu et al. .................... 178/18.06 |
| 2007/0257890 A1 * | 11/2007 | Hotelling et al. ............. 345/173 |
| 2010/0073325 A1 * | 3/2010 | Yang .............................. 345/174 |
| 2010/0194695 A1 | 8/2010 | Hotelling et al. |
| 2012/0105357 A1 | 5/2012 | Li et al. |
| 2012/0262384 A1 * | 10/2012 | Kim et al. ..................... 345/173 |

FOREIGN PATENT DOCUMENTS

| CN | 102375640 | 3/2012 |
| JP | 2009-193482 | 8/2009 |
| JP | 2012-043275 | 3/2012 |
| JP | 2012-098687 | 5/2012 |
| TW | 201032115 | 9/2010 |
| TW | 201104261 | 2/2011 |
| TW | 201217863 | 5/2012 |
| WO | 2012009495 | 1/2012 |

* cited by examiner

*Primary Examiner* — Ram Mistry
(74) *Attorney, Agent, or Firm* — Jianq Chyun IP Office

(57) ABSTRACT

A driving method for a touch panel is provided. The touch panel has a plurality of electrodes, the plurality of electrodes are coupled to a driving circuit respectively via different electrical paths. The driving method includes: defining a plurality of sub-frame periods in a first frame period; converting a driving configuration for providing the driving configuration that is different from each other respectively to each of the sub-frame periods; the driving circuit drives the electrodes respectively with the driving configuration corresponding to one of the sub-frame periods during the sub-frame periods for obtaining at least one of the sub-frame sensing values from each of the sub-frame periods; and the driving circuit integrates the sub-frame sensing values respectively obtained during the sub-frame periods for obtaining a touch information of the touch panel during the first frame period.

17 Claims, 17 Drawing Sheets

DRIVING METHOD FOR TOUCH PANEL AND TOUCH-SENSING DEVICE USING THE SAME

CROSS-REFERENCE TO RELATED APPLICATION

This application claims the priority benefit of Taiwan application serial no. 101120152, filed on Jun. 5, 2012. The entirety of the above-mentioned patent application is hereby incorporated by reference herein and made a part of this specification.

BACKGROUND OF THE INVENTION

1. Field of the Invention

The invention relates to a driving method and a touch-sensing device thereof, and more particularly relates to a driving method for a touch panel and a touch-sensing device thereof.

2. Description of Related Art

As wireless mobile communication and consuming electronics have been rapidly developed and advanced, to achieve more convenience, more compact and light volume and more intuitive designs as to bridge the gap between users and computer devices, various information products have changed from using conventional input devices such as key boards or mice to using touch panels.

For the types of the touch panels, the touch panels may be divided into a single layer electrode structure and a double layer electrode structure according to the arrangement of the electrodes, for example, a touch panel with a single indium tin oxide (SITO) electrode structure or a touch panel with a double indium tin oxide (DITO) electrode structure. In which, for example, the touch panel with the SITO electrode structure is fabricated by forming the ITO electrodes onto the same side of a glass substrate or a plastic substrate, whereas the touch panel with the DITO electrode structure is fabricated by forming the ITO electrodes onto both sides of a glass substrate. Therefore, a thickness of the touch panel with the SITO electrode structure may be relatively thinner. As for the touch panel with the DITO electrode structure, a noise isolation thereof may be enhanced by using the ITO electrodes below the glass substrate or the plastic substrate as a shielding layer.

In other words, when it comes to choose a proper type of touch panel in a designing aspect, the first problem to the designer is the trade off of its major features. For example, when the designer has chosen the touch panel with single layer structure, the touch panel may bear a higher noise effect to have a thinner thickness.

In addition, a driving circuit in the touch-sensing device of related art generally drives each electrode within the touch panel via the fixed sensing channels within the touch panel. Therefore, a sensing pitch in the touch panel is generally a fixed value. The method of increasing the sensing sensitiveness of by reducing the sensing pitch may only be achieved by increasing the number of the electrodes within the touch panel to reduce the sensing pitch. However, the method of increasing the number of the electrodes may increase the manufacturing cost of the touch-sensing device due to the restriction of the manufacturing technology. Moreover, the increasing of the alignments may also increase the difficulty of designing the alignment of the touch panel.

SUMMARY OF THE INVENTION

The invention is directed to a driving method for a touch panel, which may drive the touch panel by converting a driving configuration respectively during different sub-frame periods, so that a shielding effect may be provided to the touch panel equivalently during each of the frame periods by using the method of time division multiplexing, and a sensing mechanism of active stylus may also be provided thereto.

The invention provides a touch-sensing device, in which a driving circuit controls a driving configuration of a touch panel and drives the touch panel by converting the driving configuration respectively during different sub-frame periods.

The invention provides a driving method for a touch panel. The touch panel has a plurality of electrodes, the plurality of electrodes are coupled to a driving circuit respectively via different electrical paths. The driving method including: defining a plurality of sub-frame periods in a first frame period; converting a driving configuration for providing the driving configuration that is different from each other respectively to each of the sub-frame periods, wherein the driving configuration comprises corresponding relations of a first electrode, a second electrode and a third electrode among the electrodes which are respectively corresponding to a first operational configuration, a second operational configuration and a third operational configuration; the driving circuit drives the electrodes with the driving configuration corresponding to one of the sub-frame periods during the one of sub-frame periods for obtaining at least one of the sub-frame sensing values of the one of the sub-frame periods; and the driving circuit integrates the sub-frame sensing values respectively obtained during the plurality of sub-frame periods for obtaining a touch information of the touch panel during the first frame period.

According to an embodiment of the invention, the steps for converting the driving configuration includes: during a first sub-frame period of the first frame period, setting the first electrode to operate in the first operational configuration, setting the second electrode to operate in the second operational configuration and setting the third electrode to operate in the third operational configuration; during a second sub-frame period of the first frame period, setting the first electrode to operate in the second operational configuration, setting the second electrode to operate in the third operational configuration and setting the third electrode to operate in the first operational configuration; and during a third sub-frame period of the first frame period, setting the first electrode to operate in the third operational configuration, setting the second electrode to operate in the first operational configuration and setting the third electrode to operate in the second operational configuration.

According to an embodiment of the invention, the steps for integrating the sub-frame period sensing values respectively during the plurality of sub-frame periods includes: storing the sub-frame sensing values obtained during the plurality of sub-frame periods; and reading and integrating the sub-frame sensing values of the sub-frame periods for obtaining the touch information of the touch panel during the first frame period when the first frame period is ended.

According to an embodiment of the invention, the steps for driving the plurality of electrodes with the driving configuration during the plurality of sub-frame periods includes: the driving circuit provides a driving signal to the electrodes having the first operational configuration; the driving circuit reads the sub-frame sensing values from the electrodes having the second operational configuration; and the driving circuit provides a shield potential to the electrodes having the third operational configuration.

According to an embodiment of the invention, a shield potential is a ground voltage.

According to an embodiment of the invention, the sub-frame sensing values include an active stylus sensing value and a non-active stylus sensing value, and the step of driving the electrodes with the driving configuration during the sub-frame periods includes: the driving circuit provides a driving signal to the electrodes having the first operational configuration; the driving circuit reads the non-active stylus sensing values from the electrodes having the second operational configuration; and the driving circuit reads the active stylus sensing values from the electrodes having the third operational configuration, wherein the active stylus sensing values have a specific frequency.

According to an embodiment of the invention, the driving configuration includes corresponding relations of the first electrode, the second electrode, the third electrode and a fourth electrode among the plurality of electrodes which are respectively corresponding to the first operational configuration, the second operational configuration, the third operational configuration and a fourth operational configuration, and the sub-frame sensing values include an active stylus sensing value and a non-active stylus sensing value, and the step of driving the plurality of electrodes with the driving configuration during the sub-frame periods includes: the driving circuit provides a driving signal to the electrodes having the first operational configuration; the driving circuit reads the non-active stylus sensing values from the electrodes having the second operational configuration; the driving circuit provides a shield potential to the electrodes having the third operational configuration; and the driving circuit reads the active stylus sensing values from the electrodes having the fourth operational configuration. In which the active stylus sensing values have a specific frequency.

The invention provides a touch-sensing device, including a touch panel and a driving circuit. The touch panel has a plurality of electrodes, and the plurality of electrodes at least includes a first electrode, a second electrode and a third electrode. The driving circuit is electrically connected to the touch panel. In which, the plurality of electrodes are coupled to the driving circuit respectively via different electrical paths. The driving circuit defines a plurality of sub-frame periods in a first frame period. The driving circuit converts a driving configuration for providing the driving configuration that is different from each other respectively to each of the plurality of sub-frame periods, in which the driving configuration includes corresponding relations of the first electrode, the second electrode and the third electrode that are respectively corresponding to a first operational configuration, a second operational configuration and a third operational configuration. The driving circuit drives the electrodes with the driving configuration corresponding to one of the sub-frame periods during the one of the sub-frame periods for obtaining at least one of the sub-frame sensing values of the one of the sub-frame periods. And, the driving circuit integrates the sub-frame sensing values respectively obtained during the plurality of sub-frame periods for obtaining a touch information of the touch panel during the first frame period.

According to an embodiment of the invention, the second electrode and the third electrode are adjacent to each other.

According to an embodiment of the invention, the driving circuit includes a multiplex switching unit, a driving unit, a first reading unit, a second reading unit and a processing unit. The multiplex switching unit is electrically connected to the electrodes of the touch panel and configured for converting the driving configuration. The driving unit is coupled to the multiplex switching unit and configured for providing the driving signal to the electrodes having the first operational configuration through the multiplex switching unit. The first reading unit is coupled to the multiplex switching unit and configured for reading the non-active stylus sensing values from the electrodes having the second operational configuration through the multiplex switching unit. The second reading unit is coupled to the multiplex switching unit and configured for reading the active stylus sensing values from the electrodes having the third operational configuration through the multiplex switching unit. The processing unit is electrically connected to the multiplex switching unit, the driving unit, the first reading unit and the second reading unit. The processing unit is configured for controlling the multiplex switching unit to convert the driving configuration, receive and process the non-active stylus sensing values provided by the first reading unit and the active stylus sensing values provided by the second reading unit, and integrate the sub-frame sensing values respectively obtained during the plurality of sub-frame periods for obtaining a touch information of the touch panel during the first frame period.

According to an embodiment of the invention, the driving circuit includes a multiplex switching unit, a driving unit, a first reading unit, a reference unit and a processing unit. The multiplex switching unit is electrically connected to the electrodes of the touch panel and configured for converting the driving configuration. The driving unit is coupled to the multiplex switching unit and configured for providing the driving signal to the electrodes having the first operational configuration through the multiplex switching unit. The first reading unit is coupled to the multiplex switching unit and configured for reading the sub-frame sensing values from the electrodes having the second operational configuration through the multiplex switching unit. The reference unit is coupled to the multiplex switching unit for providing a shield potential to the electrodes having the third operational configuration via the multiplex switching unit. The processing unit is electrically connected to the multiplex switching unit, the driving unit, the first reading unit and the reference unit. The processing unit is configured for controlling the multiplex switching unit to convert the driving configuration, receive and process the sub-frame sensing values provided by the first reading unit, and integrate the sub-frame sensing values respectively obtained during the plurality of sub-frame periods for obtaining a touch information of the touch panel during the first frame period.

In an embodiment of the invention, the driving circuit further includes a memory unit. The memory unit is electrically connected to the processing unit and configured for storing the sub-frame sensing values obtained during the sub-frame periods.

According to an embodiment of the invention, the driving circuit includes a multiplex switching unit, a driving unit, a first reading unit, a reference unit, a second reading unit and a processing unit. The multiplex switching unit is electrically connected to the electrodes of the touch panel and configured for converting the driving configuration. The driving unit is coupled to the multiplex switching unit and configured for providing the driving signal to the electrodes having the first operational configuration through the multiplex switching unit. The first reading unit is coupled to the multiplex switching unit and configured for reading the non-active stylus sensing values from the electrodes having the second operational configuration through the multiplex switching unit. The reference unit is coupled to the multiplex switching unit for providing a shield potential to the electrodes having the third operational configuration via the multiplex switching unit. The second reading unit is coupled to the multiplex switching unit and configured for reading the active stylus sensing values from the electrodes having the fourth operational configuration through the multiplex switching unit. The processing unit is electrically connected to the multiplex switching unit, the driving unit, the first reading unit, the second reading unit and the reference unit. The processing unit is configured for controlling the multiplex switching unit to convert the driving configuration, and receive and process the non-active stylus sensing values provided by the first reading unit and the active stylus sensing values provided by the second reading unit. And, the processing unit integrates the sub-frame sensing values respectively obtained during the plurality of sub-frame periods for obtaining a touch information of the touch panel during the first frame period.

Based on above, the driving method of the touch panel and the touch-sensing device thereof in the embodiments of the invention may convert a driving configuration of the touch panel during a plurality of the sub-frame periods, so that a shielding effect may be provided to the touch panel equivalently during each of the frame periods by using the method of time division multiplexing, thereby increasing the noise isolation of the touch-sensing device while optimizing the size of the touch-sensing device. Also, the equivalent sensing pitch of each electrode within the touch panel may also be reduced by using said driving method so that the touch sensitiveness of the touch panel may be increased.

To make the above features and advantages of the invention more comprehensible, several embodiments accompanied with drawings are described in detail as follows.

BRIEF DESCRIPTION OF THE DRAWINGS

FIG. 2 is a schematic view illustrating a structure of the touch panel according to the embodiment of FIG. 1a.

DESCRIPTION OF THE EMBODIMENTS

Figure 1A:
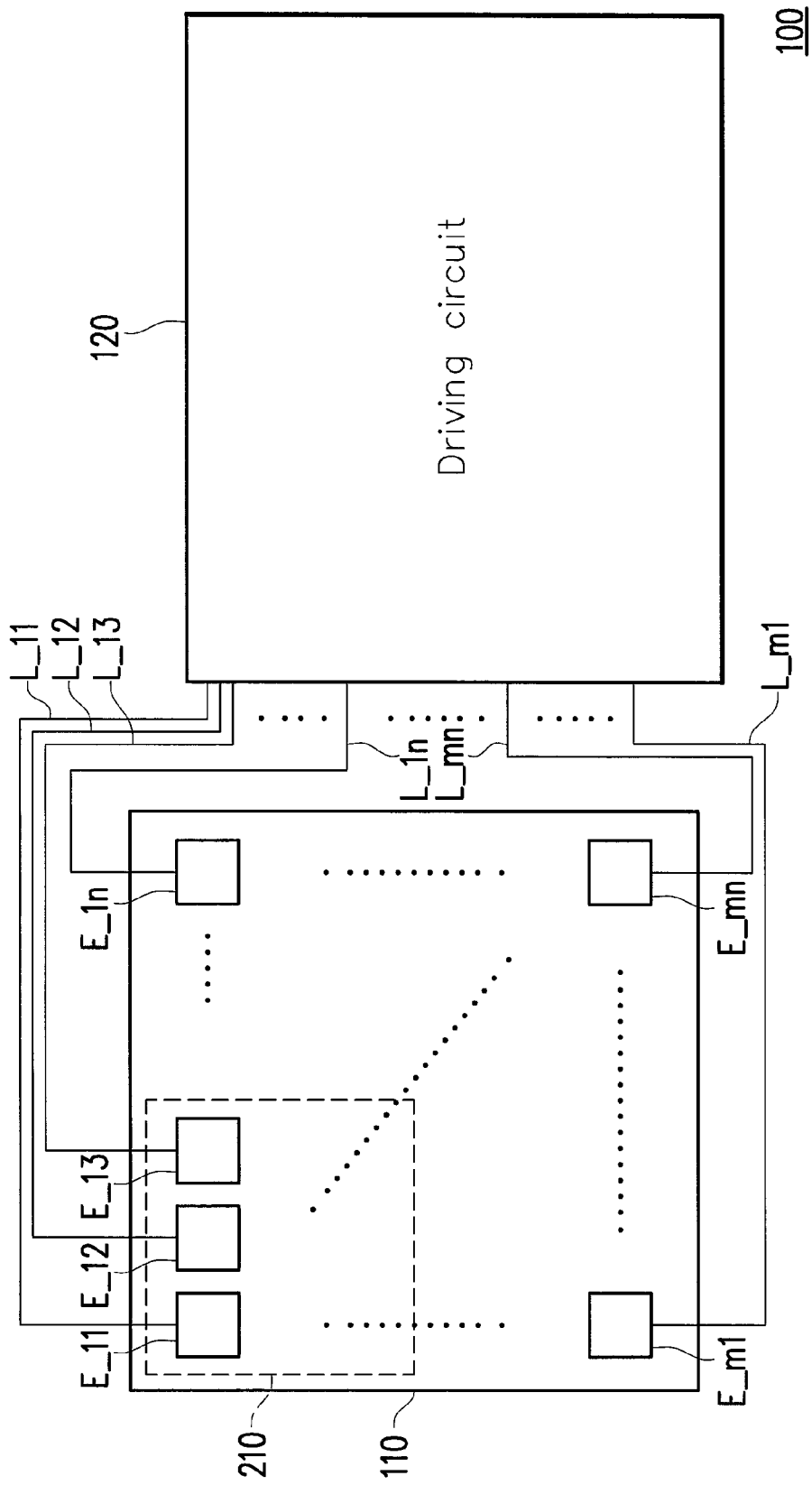
FIG. 1a is a schematic view illustrating a touch-sensing device 100 according to an embodiment of the invention.

The embodiments of the invention are directed to a driving method for a touch panel and a touch-sensing device thereof. Said driving method may convert the driving configuration of the touch panel during a plurality of the sub-frame periods, so that a shielding effect (which is similar to the touch panel with double layer structure) may be provided to the touch panel equivalently during each of the frame periods by using the method of time division multiplexing, thereby increasing the noise isolation of the touch-sensing device. In order to make the invention more comprehensible, embodiments are described below as the examples to prove that the invention can actually be realized. Moreover, elements/components/steps with same reference numerals represent same or similar parts in the drawings and embodiments.

FIG. 1a is a schematic view illustrating a touch-sensing device 100 according to an embodiment of the invention. Referring FIG. 1a, the touch-sensing device 100 includes a touch panel 110 and a driving circuit 120. The touch panel 110 has a plurality of electrodes $E\_11$, $E\_12$, $E\_13$, $E\_1n$, $E\_m1$, $E\_nm$, in which m and n are respectively representing a positive integer. The electrodes $E\_11$ to $E\_nm$ at least include two electrodes (e.g., a first electrode $E\_11$ and a second electrode $E\_12$ which are adjacent to each other) having different operational configurations. The driving circuit 120 is electrically connected to the touch panel 110. The electrodes $E\_11$ to $E\_nm$ are coupled to the driving circuit 120 respectively via different electrical paths $L\_11$ to $L\_mn$. Therefore, the driving circuit 120 may convert the driving configuration via the electrical paths $L\_11$ to $L\_nm$ during a plurality of sub-frames in a first frame period, so that a touch information during the first frame period may be obtained by driving the sensing electrodes $E\_11$ to $E\_nm$ using different driving configurations.

For the first electrode $E\_11$, the second electrode $E\_12$ and the third electrode $E\_13$ having different operational configurations from each other, in which the driving configuration includes corresponding relations of the first electrode $E\_11$, the second electrode $E\_12$ and the third electrode $E\_13$ that are respectively corresponding to a first operational configuration, a second operational configuration and a third operational configuration. Therefore, when the driving configuration is converted by the driving circuit 120, namely, at least two of the operational configurations corresponding to the first electrode $E\_11$, the second electrode $E\_12$ and the third electrode $E\_13$ are changed, such that the at least two of the operational configurations corresponding to the first electrode $E\_11$, the second electrode $E\_12$ and the third electrode $E\_13$ may be switched during the sub-frame periods.

In an aspect of the overall driving process of the touch panel 110, each of the electrodes $E\_11$ to $E\_nm$ is respectively set to one of the three operational configurations. Therefore, when the driving configuration is converted by the driving circuit 120, a signal corresponding to the operational configuration may be respectively provided to the corresponding electrode according to the corresponding operational configuration of each electrode, or a sensing value may be received from the corresponding electrode according to the corresponding operational configuration.

For example, the driving circuit 120 is configured for providing a driving signal to the electrodes having the first operational configuration, reading sub-frame sensing values from electrodes having the second operational configuration and providing a shield potential to the electrodes having the third operational configuration, regardless of which driving configuration is applied to the driving circuit 120. When the driving configuration is converted by the driving circuit 120 during different sub-frame periods, a corresponding signal is provided by the driving circuit 120 to a corresponding electrode according to the operational configuration of the electrodes E_11 to E_mn of the switched sub-frame period, or the sensing value is read from the corresponding electrode, so that each of the electrodes E_11 to E_nm may be a electrode equivalently having the first operational configuration, the second operational configuration and the third operational configuration at the same time during the first frame period using a method of time division multiplexing.

Figure 1B:
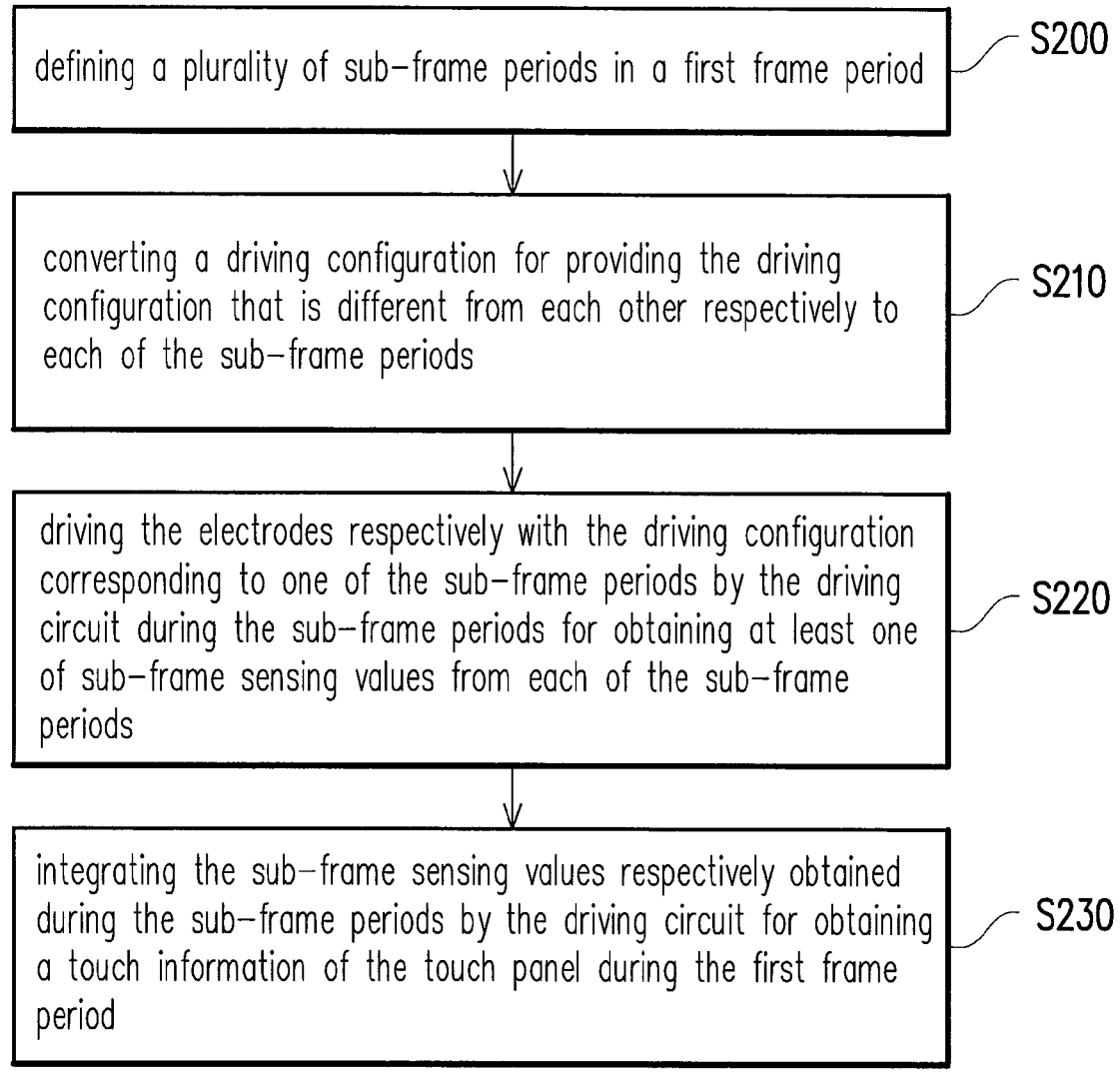
FIG. 1b is a schematic flowchart illustrating a driving method for a touch panel according to an embodiment of the invention.

Another embodiment is exemplified as to further describe the operation of the touch-sensing device 100 in another embodiment of the invention. Referring to FIG. 1a and FIG. 1b together, in which FIG. 1b is a schematic flowchart illustrating a driving method for a touch panel according to an embodiment of the invention.

As shown in FIG. 1b, the driving method for the touch panel begins with step S200. Firstly, the driving circuit 120 defines a plurality of sub-frame periods in a first frame period (step S200). In which, the plurality of sub-frame periods may be sub-frame periods preset by the driving circuit 120 according a length of the first frame period or the sub-frame periods with a length dynamically adjusted by the driving circuit 120 according to the requests from other programs, the invention is not limited thereto. In addition, in the case where implementation of the sub-frame periods are dynamically adjusted by the driving circuit according to the requests from other programs, the driving circuit may pre-define each of the sub-frame periods in the next frame period before current frame period is ended or define the next sub-frame period at current frame period, the invention is not limited thereto.

Next, the drive circuit 120 converts a driving configuration for providing the driving configuration that is different from each other to each of the sub-frame periods (step S210). Therefore, the driving circuit 120 may drive the electrodes E_11 to E_nm with the driving configuration corresponding to the plurality of the sub-frame periods, so that the sub-frame sensing values within the sub-frame periods may be obtained (step S220). When the first frame period is ended, the driving circuit 120 integrates the sub-frame sensing values obtained during each sub-frame period of the first frame period, thereby obtaining a touch information of the touch panel 110 during the first frame period (step S230).

Although it is exemplified herein with obtaining the touch information by integrating the sub-frame sensing values obtained by the driving circuit 120 when the first frame period is ended, the invention is not limited thereto The driving circuit 120 may also directly transmit the sub-frame sensing values to other processor (e.g., the processor coupled to the driving circuit 120) when each time a sub-frame sensing value is obtained. As a result, the computation of the driving circuit 120 may be decreased so that the hardware requirement of the driving circuit 120 may also be reduced.

More specifically, the touch panel 110 of the present embodiment may be, for example, a capacitive touch panel with the electrodes E_11 to E_nm made of transparent conductive oxide (TCO) such as a touch panel with SITO electrodes structure. In this type of touch panel, the electrodes are formed on the same side of the glass substrate so that a thickness of the touch panel may be reduced. However, generally this type of touch panel may not isolate the noise effect between the electrodes by using the ITO electrodes below the glass substrate as the shielding layer. Therefore, the touch panel with the single layer electrode structure may suffer a more serious noise effect in comparing to the touch panel with DITO electrode structure.

Further, fixed electrodes are usually used by the driving circuit as the driving electrodes for providing driving signals or the sensing electrodes for reading the sensing values in conventional touch-sensing device. When the number of the electrodes is fixed, the sensing sensitiveness may not be increased easily since the sensing pitch is restricted.

However, in the touch-sensing device 100 of the present embodiment, the driving circuit 120 further provides a shield potential (e.g., a ground voltage) to the touch panel 110 and drives the touch panel 110 with single layer structure by switching the operational configuration of each electrode during different sub-frame periods. Therefore, during each frame period, the electrodes E_11 to E_m may be equivalently operated in the first operational configuration, the second operational configuration and the third operational configuration at the same time by applying a concept of time division multiplexing. As for the touch panel 110 may be a touch panel equivalently having the shielding layer, the touch panel 110 may have a shielding feature similar to the touch panel with DITO structure, thereby increasing the noise isolation. Further, the equivalent sensing pitch of the touch panel 110 may be reduced accordingly so that the touch sensitiveness of the touch panel 110 may be increased.

In addition, a traditional touch panel usually forms a sensing channel by coupling the electrodes along an axis direction using a serial attached method, so that the driving circuit may output driving signal to the electrodes on the same sensing channel or reads sensing values of the electrodes on the same sensing channel. In comparison, the electrodes E_11 to E_mn on the touch panel 110 of the present embodiment are coupled to the driving circuit 120 respectively via different electrical paths L_11 to L_mn. In other words, each of the electrodes E_11 to E_mn is coupled to the driving circuit 120 using an independent wiring method, so that the driving circuit 120 may individually control the operational configuration of each of the electrodes E_11 to E_mn. Therefore, a group driving method with higher dynamic may be further achieved by using the touch-sensing device 100 with the touch panel 110 structure, such that the overall power dissipation of the touch-sensing device 100 may be reduced accordingly.

In addition, the touch panel 110 having the independent wiring structure may be implemented by using a co-plane electrode structure, a line embedded electrode structure or a mixed electrode structure of co-plane and line embedded. In comparing to a processing method for traditional single layer ITO electrode, a processing method for said electrode structure is relatively simpler, which may be completed by fewer steps, thereby reducing the overall costs.

Figure 2:
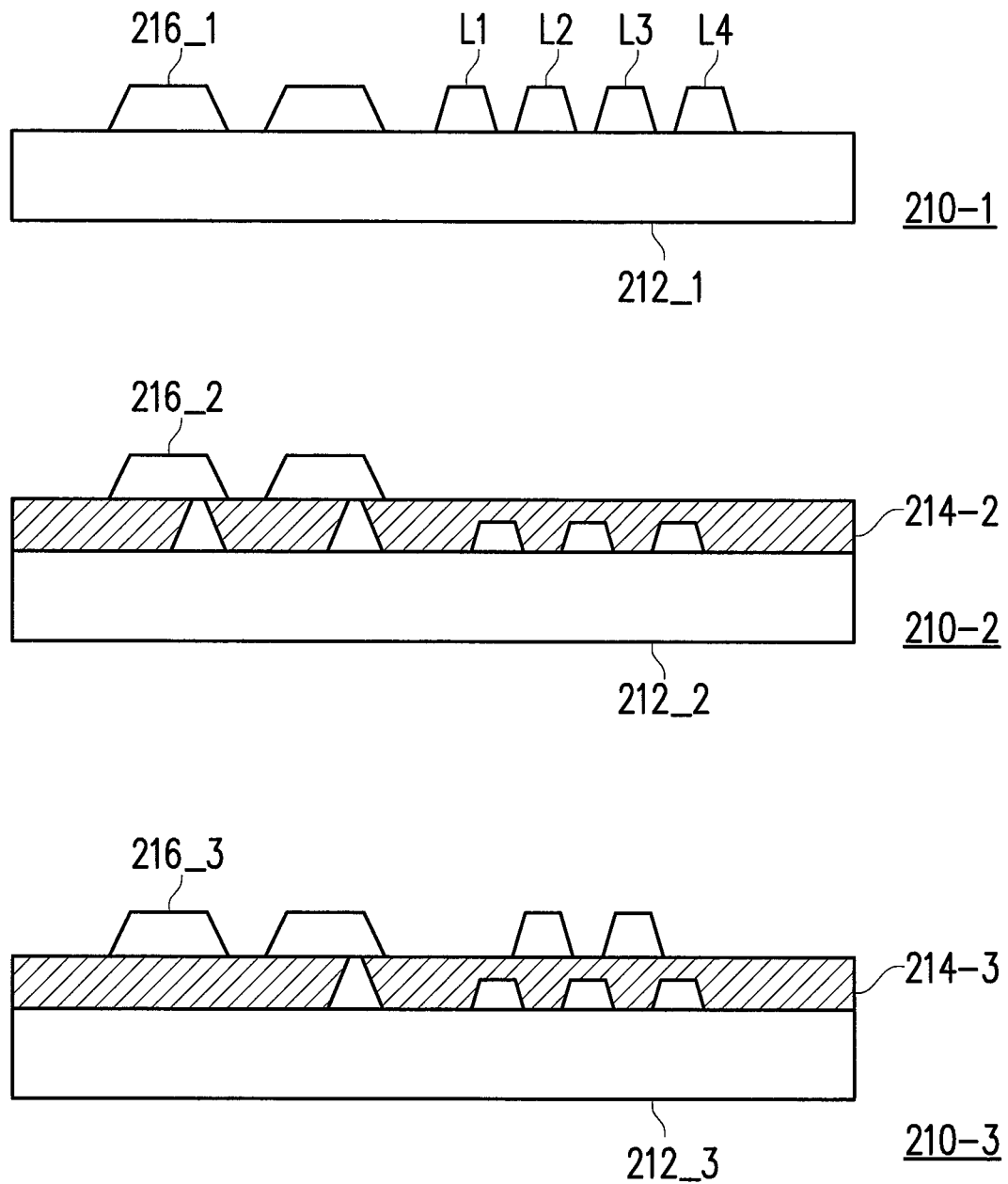

FIG. 2 is a schematic view illustrating a structure of the touch panel according to the embodiment of FIG. 1a. Referring to FIG. 2, a co-plane electrode structure 210_1, a line embedded electrode structure 210_2 or a mixed electrode structure of co-plane and line embedded are respectively illustrated in FIG. 2. In which, the co-plane electrode structure 210_1 may be implemented with a simpler process since a protection layer (e.g., a protection layer 214_2 in the line embedded electrode structure 210_2 and the protection layer 214_3 in the mixed electrode structure of co-plane and line embedded 210_3) is not required to be formed on the substrate 212.

More specifically, when ITO is used as the material of the electrode in the process method of the co-plane electrode structure 210_1, an ITO electrode (e.g., the electrode 216_1) is firstly formed by placing a substrate 212_1 and sputter etching the ITO material thereon. Next, the electrical paths (e.g., the electrical paths L1 to L4) are formed by redepositing and etching a metal material followed by redepositing an oxide layer thereon. As a result, the process of forming the co-plane electrode structure 210_1 only requires three photomasks (ITO etching, metal etching and oxide redepositing), which is two less steps of forming photomasks in comparing to the process in the conventional electrode structure.

On the other hand, as for the line embedded electrode structure 210_2 and the mixed electrode structure of co-plane and line embedded 210_3, in which all or a portion of the lines are embedded in the protection layer of the line embedded electrode structure 210_2 and the mixed electrode structure of co-plane and line embedded 210_3. Therefore, in comparing to the process of the co-plane electrode structure 210_1, a process of redepositing an insulating layer and a process of sputter and etching ITO are further required. However, since the electrode structure with independent wiring to the driving circuit may be implemented by all of said three electrode structures, the electrode structure in the embodiment of the invention may provide a more flexible control than that of the traditional touch panel.

Furthermore, the electrodes E_11 to E_nm of the present embodiment may be electrodes of any shape, and the electrodes E_11 to E_nm as illustrated in FIG. 1a are schematic only, which are not representing the shape of the electrode in the practical uses. Further, the material for the electrodes E_11 to E_nm are not limited only to ITO, other conductive polymers such as indium zinc oxide (IZO), aluminum zinc oxide (AZO) or similar materials may also be used as the material for the electrodes E_11 to E_nm, the invention is not limited thereto.

Figure 3:
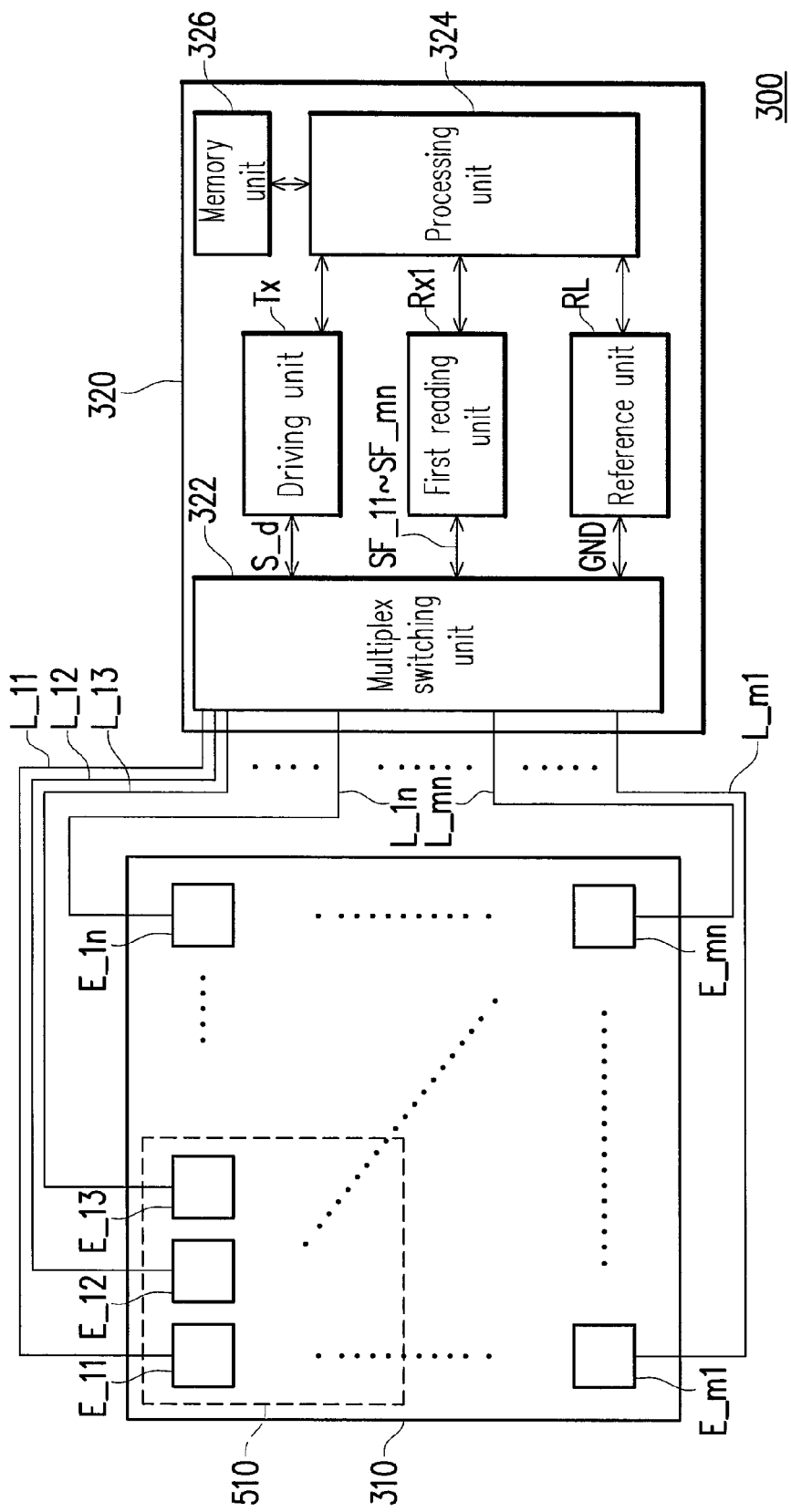
FIG. 3 is a schematic view illustrating a touch-sensing device 300 according to an embodiment of the invention.

FIG. 3 is a schematic view illustrating a touch-sensing device 300 according to an embodiment of the invention. Referring FIG. 3, the touch-sensing device 300 includes a touch panel 310 and a driving circuit 320. In which, the structure of the touch panel 310 is the same to that of the touch panel 110 in the previous embodiment, so it is omitted hereinafter.

In the present embodiment, the driving circuit 320 includes a multiplex switching unit 322, a driving unit Tx, a first reading unit Rx1, a reference unit RL, a processing unit 324 and a memory unit 326. The multiplex switching unit 322 is electrically connected to electrodes E_11 to E_nm of the touch panel 310 respectively via electrical paths L_11 to L_nm for converting the driving configuration. The driving unit Tx is coupled to the multiplex switching unit 322 for providing a driving signal s_d to the electrodes having a first operational configuration T via the multiplex switching unit 322. The first reading unit Rx1 is coupled to the multiplex switching unit 322 for reading the sub-frame sensing values SF_11 to SF_nm from the electrodes having a second operational configuration via the multiplex switching unit 322. The reference unit RL is coupled to the multiplex switching unit 322 for providing a shield potential GND to the electrodes having the third operational configuration via the multiplex switching unit 322. The processing unit 324 is electrically connected to the multiplex switching unit 322, the driving unit Tx, the first reading unit Rx1 and the reference unit RL. The multiplex switching unit 322 is controlled by the processing unit 324 for converting the driving configuration, receiving and processing the sub-frame sensing values SF_11 to SF_nm provided by the first reading unit Rx1, and integrating the sub-frame sensing values SF_11 to SF_nm obtained during each of the sub-frame periods for obtaining a touch information of the touch panel 110 during the first frame period. The memory unit 326 is electrically connected to the processing unit 324, in which the memory unit 326 stores the sub-frame sensing values SF_11 to SF_mn obtained by the process unit 324 during each of the sub-frame periods.

Figure 4:
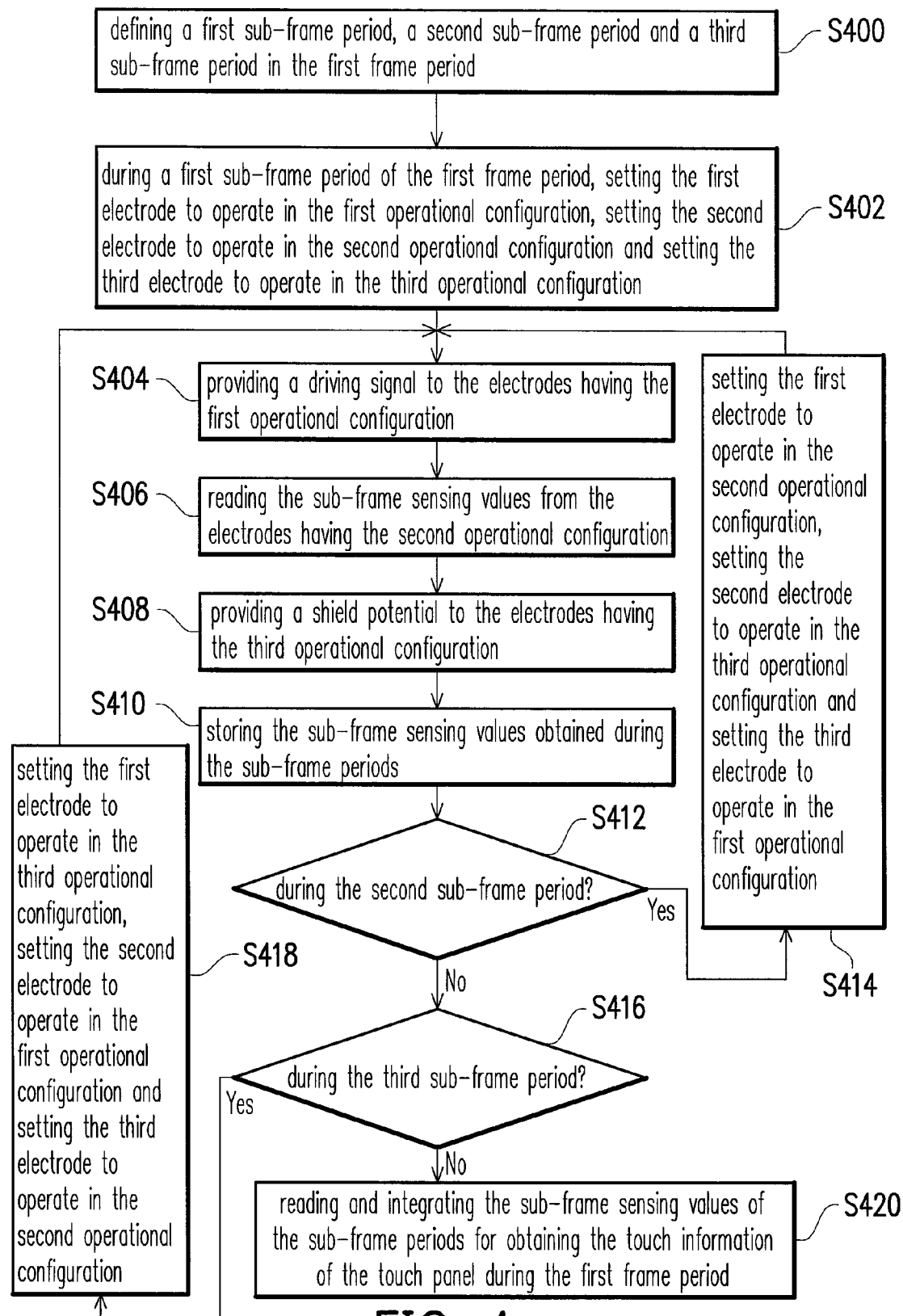
FIG. 4 is a schematic flowchart illustrating a driving method for the touch panel according to the embodiment of FIG. 3.
Figure 5:
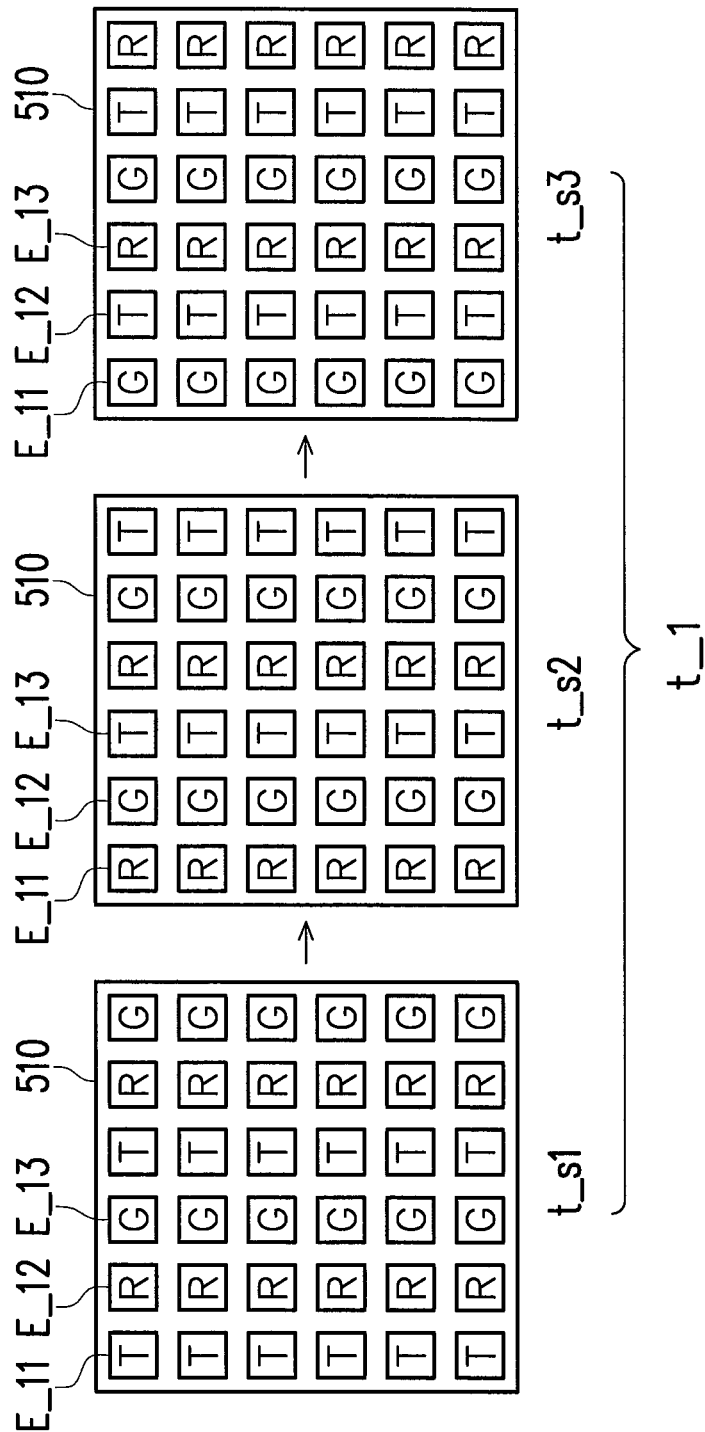
FIG. 5 is a schematic view illustrating an operation of a touch block 510 during a first frame period of FIG. 3.

Referring to FIG. 3, FIG. 4 and FIG. 5 together for further description of the operation of the touch-sensing device 300 in the embodiment of the invention. In which, FIG. 4 is a schematic flowchart illustrating a driving method for the touch panel according to the embodiment of FIG. 3; FIG. 5 is a schematic view illustrating an operation of a touch block 510 during a first frame period of FIG. 3.

Further, in order to simplify the description of the driving method for the touch panel 310 in FIG. 5, it is exemplified using the touch block 510 of the touch panel 310 during a first frame period t_1 with operational configurations during a first sub-frame period t_s1, a second sub-frame period t_s2 and a third sub-frame period t_s3 in FIG. 3. In which the touch block 510 is a partial area of the electrode sets within the touch panel 310 which is exemplified with a dimension of 6×6 in the present embodiment, the invention is not limited thereto. In the present embodiment, the driving circuit 320 drives the electrodes of the same row according to the same driving configuration, such that the electrodes of the same row may have the same operational configuration. In addition, when the driving configuration is converted by the driving circuit 320, the driving method of the present embodiment is implemented by the driving circuit 320 using a method of sequentially converting the operational configurations between different rows of the electrodes. It is exemplified hereinafter using the first electrode E_11, the second electrode E_12 and the third electrode E_13, which are adjacent to each other and each having different operational configurations.

More specifically, the touch panel 110 is driven by the driving circuit 320 using three units which have different functions, including the driving unit Tx, the first reading unit Rx1 and the reference unit RL. Therefore, the driving circuit 320 may respectively define three sub-frame periods in the first frame period t_1, including a first sub-frame period t_s1, the second sub-frame period t_s2 and the third sub-frame period t_s3 (step S400). For example, when the first frame period t_1 is 60 micro second (ms), the driving circuit 320 defines the first sub-frame period t_s1, the second sub-frame period t_s2 and the third sub-frame period t_s3 to the 0 to 20 ms, the 21 to 40 ms and the 41 to 60 ms of the first frame period, respectively. In which, the length of the first frame period t_1 may be adjusted by the designer within a proper touch scanning interval (e.g., the shortest interval of double touches by the user). In addition, as for the practical uses, each of the sub-frame periods may be defined by the processing unit 324 or additional control unit, the invention is not limited thereto.

After each of the sub-frame periods is defined, the processing unit 324 may set the first electrode E_11, the second electrode E_12 and the third electrode E_13 to operate in the first operational configuration T, the second operational configuration R and the third operational configuration G via the multiplex switching unit 322 during the first sub-frame period t_s1 of the first frame period t_1 according to the driving configuration, respectively (step S402). In the present embodiment, the processing unit 324 during the first sub-frame period t_s1 sets, for example, the electrodes E_11 to E_m1 of a first row to operate in the first operational configuration T, the electrodes E_12 to E_m2 of a second row to operate in the second operational configuration R and the electrodes E_13 to E_m3 of a third row to operate in the third operational configuration G; since the present embodiment has three operational configurations, so that the electrodes E_14 to E_m4 of a fourth row are set to operate in the first operational configuration T during the first sub-frame period t_s1, and the rest of the electrodes are also set with the same method.

During the process of the driving circuit 320, the driving unit Tx of the driving circuit 320 provides a driving signal s_d to the electrodes having the first operational configuration T such as the electrodes of the first, the fourth and the seventh rows (step S404); the first reading unit Rx1 reads sub-frame sensing values from the electrodes having the second operational configuration R such as the electrodes of the second, the fifth and the eighth rows (step S406); the reference unit RL provides a shield potential GND to the electrodes having the third operational configuration G such as the electrodes of the third, the sixth and the ninth rows (step S408).

In step S410, the processing unit 324 receives the sub-frame sensing values from the first reading unit Rx1 and stores the sub-frame sensing values obtained during the sub-frame period to the memory unit 326. In which, steps S408 and S404 may be performed concurrently, whereas steps S404 to S410 may be performed concurrently; In other words, the sequence of performing steps S404 to S410 or whether said steps are performed concurrently may be change, the process sequence used in the present embodiment is merely an example. It should be considered as being in the scope of the invention as long as the steps S404 to S410 are performed during the first sub-frame period, the invention is not limited thereto.

Referring to FIG. 5 as an example for storing the sub-frame sensing value obtained during the sub-frame period to the memory unit 326. During the first sub-frame period t_s1, the first electrode E_11, the second electrode E_12 and the third electrode E_13 are respectively having the first operational configuration T, the second operational configuration R and the third operational configuration G. During said period, the driving unit Tx provides the driving signal s_d to the first electrode E_11, the first reading unit Rx1 reads the sub-frame sensing value SF_12 from the second electrode E_12 and the reference unit RL provides the shield potential GND to the third electrode E_13. In addition, the processing unit 324 stores the sub-frame sensing value SF_12 obtained during the sub-frame period t_s1 to the memory unit 326. Steps S404 to S410 are continuously performed by the processing unit 324 during the first sub-frame period t_s1 according to the setting of step S402.

After the first sub-frame period t_s1 (i.e., during the second sub-frame period t_s2), the processing unit 324 determines that the current sequence is at the second sub-frame period t_s2 and further controls the multiplex switching unit 322 to convert the driving configuration (step S412). As a result, the first electrode E_11, the second electrode E_12 and the third electrode E_13 are set to operate in the second operational configuration R, the third operational configuration G and the first operational configuration T (step S414). Next, steps S404 to S410 may then be performed.

During the second sub-frame period t_s2, the driving unit Tx provides the driving signal s_d to the third electrode E_13, the first reading unit Rx1 reads the sub-frame sensing value SF_11 from the first electrode E_11 and the reference unit RL provides the shield potential GND to the second electrode E_12. Further, the processing unit 324 stores the sub-frame sensing value SF_11 obtained during the second sub-frame period t_s2 to the memory unit 326.

After the second sub-frame period t_s2 (i.e., during the third sub-frame period t_s3), the processing unit 324 determines that the current sequence is at the third sub-frame period t_s3 and further controls the multiplex switching unit 322 to convert the driving configuration (step S416). As a result, the first electrode E_11, the second electrode E_12 and the third electrode E_13 are set to operate in the third operational configuration G, the first operational configuration T and the second operational configuration R (step S418). Next, steps S404 to S410 may then be performed.

During the third sub-frame period t_s3, the driving unit Tx provides the driving signal s_d to the second electrode E_12, the first reading unit Rx1 reads the sub-frame sensing value SF_13 from the third electrode E_13 and the reference unit RL provides the shield potential GND to the first electrode E_11. Moreover, the processing unit 324 stores the sub-frame sensing value SF_13 obtained during the third sub-frame period t_s3 to the memory unit 326.

When it is determined that the third sub-frame period t_s3 is ended in step S416, the processing unit 324 determines that the first frame period t_1 is ended, thereby reading and integrating the sub-frame sensing values SF_1 to SF_13 obtained during each of the sub-frame periods t_$s_1$ to t_s3 for obtaining a touch information of the touch panel 110 during the first frame period t_1 (step S420). Further, since the shield potential GND is provided, the first electrode E_11, the second electrode E_12 and the third electrode E_13 during the first frame period t_1 may equivalently have a shielding effect by using the method of time division multiplexing.

As for the touch block 510, in which each row of the electrodes has the same operational configuration, therefore each electrode in the touch block 510 may be implemented by using the driving method for the first electrode E_11, the second electrode E_12 and the third electrode E_13 (steps S400 to S420). Moreover, the driving method may also be expanded to each electrode of the entire touch panel 110.

It should be noted that, each of the sub-frame period defined by the driving circuit 320 is a period for completing driving of one sub-frame. In other words, a length of a sub-frame period defined by the drive circuit 320 is defined according to a required time for performing steps S404 to S410, namely, a sub-frame period is a time period for completing steps S404 to S410. Further, steps S412 and S416 are determinations made by the processing unit 324 for determining the current sub-frame period.

In addition, said method for converting the driving configuration is merely an example, in other embodiment, the driving circuit may also use other arranging and converting method to acquire the time division multiplexing effect of the present embodiment. For example, the operational configuration of each electrode may be set by using an arrangement of Mosaic, the invention is not limited thereto.

Figure 6:
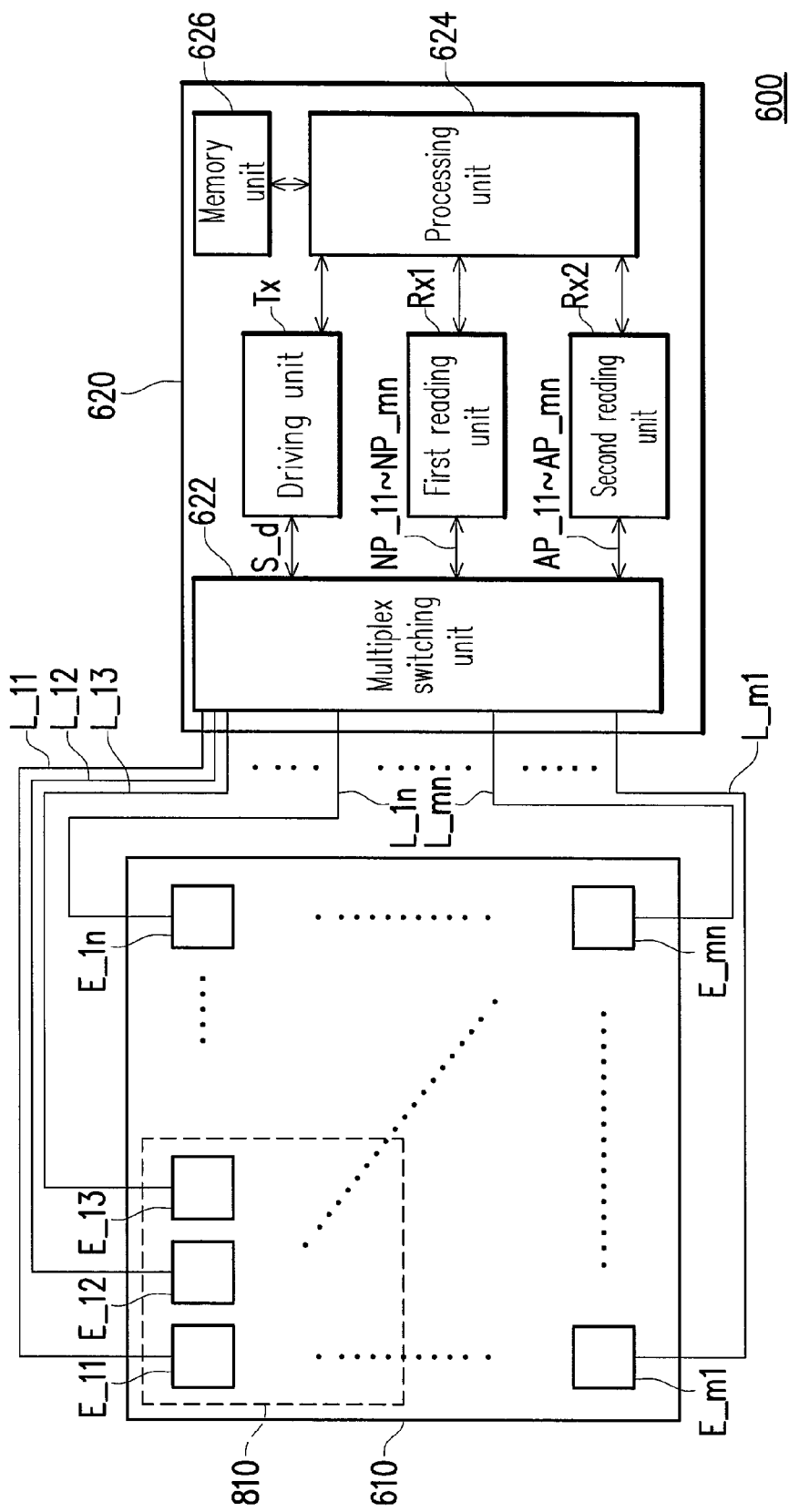
FIG. 6 is a schematic view illustrating a touch-sensing device 600 according to another embodiment of the invention.

FIG. 6 is a schematic view illustrating a touch-sensing device 600 according to another embodiment of the invention. In the present embodiment, the touch-sensing device 600 may further generate a corresponding touch information by sensing a touch of a stylus. More specifically, the type of the stylus may include a passive stylus and an active stylus. In which a touch mechanism of the passive stylus is similar to a touch mechanism of a finger touch, whereas the active stylus is configured to emit a signal with a specific frequency when touching the touch panel so that the driving circuit may read an active stylus sensing value with the specific frequency from a corresponding electrode. Therefore, in the touch-sensing device 600 which applies the stylus, the sub-frame sensing value as mentioned above may be further divided into active stylus sensing values AP_11 to AP_nm and non-active stylus sensing values NP_11 to NP_nm. In which, the non-active stylus sensing values NP_11 to NP_nm include sensing values generated by touching the touch panel with fingers and the passive stylus.

Referring FIG. 3 and FIG. 6 together, the structure of the touch-sensing device 600 is similar to that of the touch-sensing device 300, and the touch-sensing device 600 also includes a touch panel 610 and a driving circuit 620. In which, the structure of the touch panel 610 is the same to that of the touch panels 110 and 310 in previous embodiment, so it is omitted hereinafter. However, in comparing to the driving circuit 320 in FIG. 3, the driving circuit 620 may be further configured to replace the reference unit RL of the touch-sensing device 300 with the second reading unit Rx2 which reads the active stylus sensing values AP_11 to AP_nm.

More specifically, the driving circuit 620 includes a multiplex switching unit 622, a driving unit Tx, a first reading unit Rx1, a second reading unit Rx2, a processing unit 624 and a memory unit 626. In which, the first reading unit Rx1 is coupled to the multiplex switching unit 622 for reading the non-active stylus sensing values NP_11 to NP_nm from the electrodes having a second operational configuration via the multiplex switching unit 622. The second reading unit Rx2 is coupled to the multiplex switching unit 622 for reading the active stylus sensing values AP_11 to AP_nm from the electrodes having a third operational configuration via the multiplex switching unit 622. The processing unit 624 is configured for respectively receiving and integrating the non-active stylus sensing values NP_11 to NP_mn the active stylus sensing values AP_11 to AP_mn for obtaining a touch information during the first frame period. Moreover, coupling relations and functions of each unit in the driving circuit 620 is similar that of the driving circuit 320, so it is omitted hereinafter.

Figure 7:
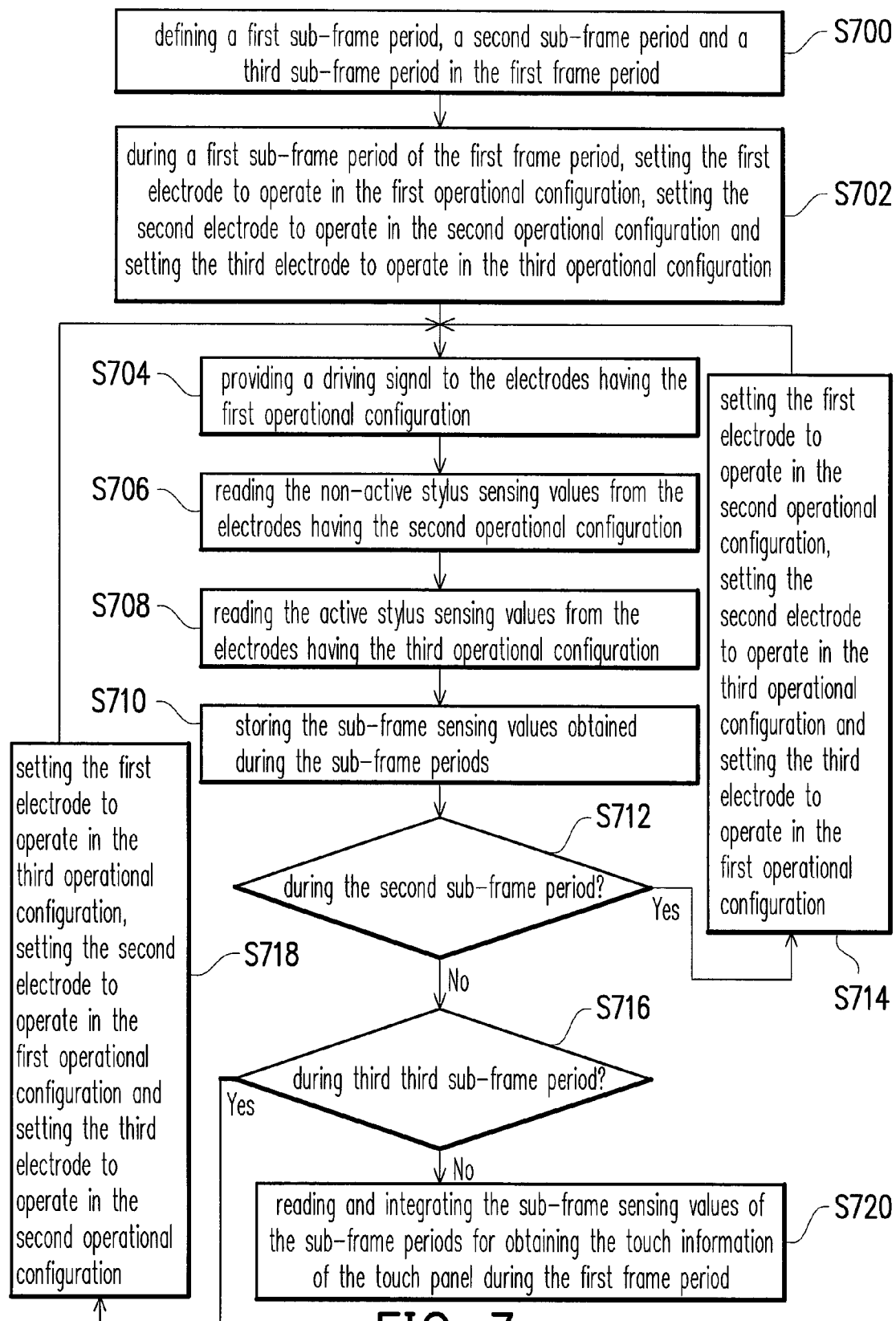
FIG. 7 is a schematic flowchart illustrating a driving method for a touch panel of FIG. 6.
Figure 8:
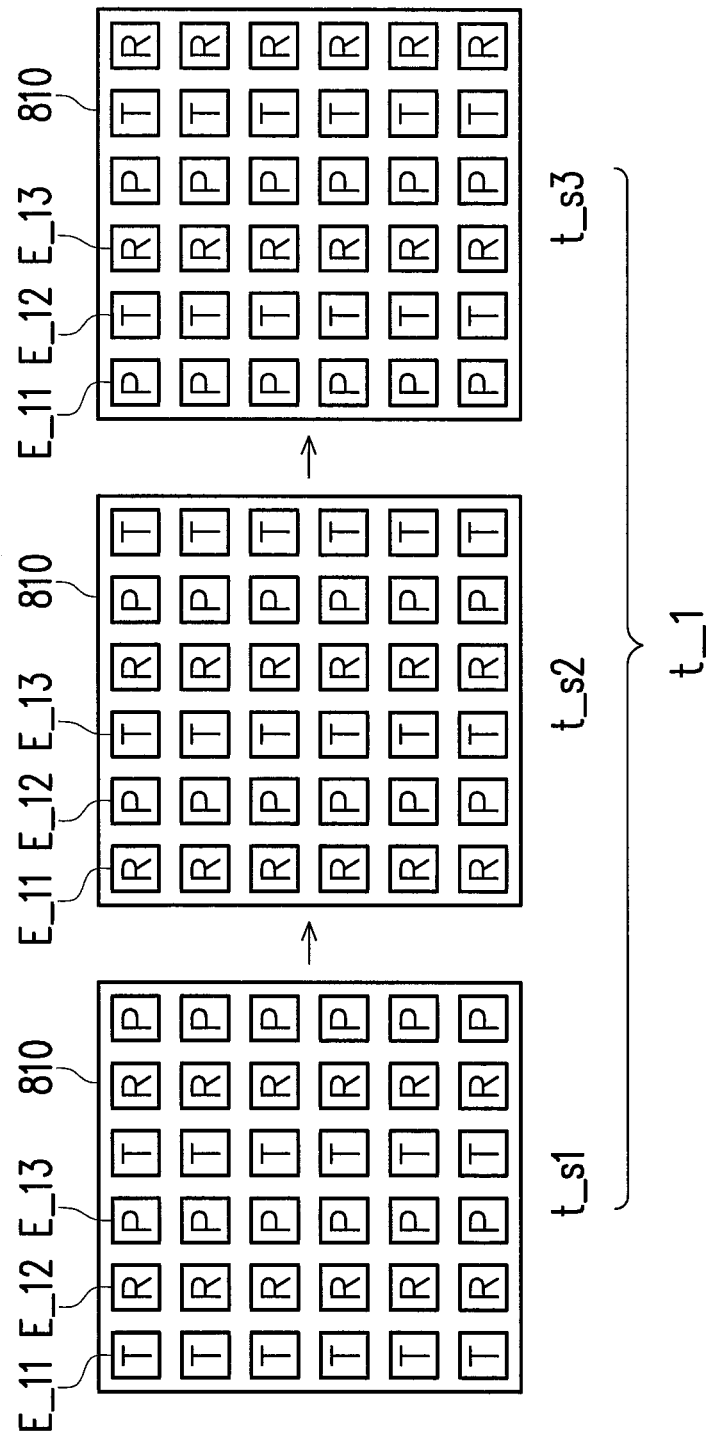
FIG. 8 is a schematic view illustrating an operation of a touch block 810 during a first frame period of FIG. 6.

Referring to FIG. 6, FIG. 7 and FIG. 8 together for further description of operations of the touch-sensing device 600 in another embodiment of the invention. In which, FIG. 7 is a schematic flowchart illustrating a driving method for a touch panel of FIG. 6; FIG. 8 is a schematic view illustrating an operation of a touch block 810 during a first frame period.

Further, in order to simplify the description of the driving method of the touch panel 110, FIG. 8 is exemplified using the touch block 810 of the touch panel 610, in which the first electrode E_11, the second electrode E_12 and the third electrode E_13 are adjacent to each other and having different operational configurations. In which the touch block 810 is a partial area of the electrode sets within the touch panel 610 which is exemplified with a dimension of 6×6 in the present embodiment, the invention is not limited thereto.

In FIG. 7, step S700 is similar to step S400 of FIG. 4. The touch panel 110 is driven by the driving circuit 620 using three units with different functions, including the driving unit Tx, the first reading unit Rx1 and the second reading unit Rx2. Therefore, the driving circuit 620 may respectively define three sub-frame periods in the first frame period t_1, including a first sub-frame period t_s1, the second sub-frame period t_s2 and the third sub-frame period t_s3. In which, the specific implementation for defining the sub-frame periods within the first frame period by the driving circuit 620 may be referred to the related description for defining the sub-frame periods by the drive circuit 120 in step S200 of the embodiment as shown in FIG. 1b, so it is omitted hereinafter.

After each of the sub-frame periods is defined, the processing unit 624 may set the first electrode E_11, the second electrode E_12 and the third electrode E_13 to operate in the first operational configuration T, the second operational configuration R and the third operational configuration G via the multiplex switching unit 622 during the first sub-frame period t_s1 of the first frame period t_1, respectively (step S702).

During the first sub-frame period t_s1, the driving unit Tx of the driving circuit 620 provides a driving signal s_d to the electrodes having the first operational configuration T (step S704); the first reading unit Rx1 reads the non-active stylus sensing values from electrodes having the second operational configuration R (step S706); and the second reading unit Rx2 reads the active stylus sensing values from the electrodes having the third operational configuration P (step S708).

Next, the processing unit 624 receives the non-active stylus sensing values and the active stylus sensing values respectively obtained from the first reading unit Rx1 and the second reading unit Rx2 during the first sub-frame period t_s1, and stores the non-active stylus sensing values to the memory unit 626 (step S710). In other words, the processing unit 624 stores the sub-frame sensing values obtained during the sub-frame period in step S710.

During the first sub-frame period t_s1, the first electrode E_11, the second electrode E_12 and the third electrode E_13 are electrodes respectively having the first operational configuration T, the second operational configuration R and the third operational configuration P. In this case, the driving unit Tx provides the driving signal s_d to the first electrode E_11, the first reading unit Rx1 reads the non-active stylus sensing value NP_12 from the second electrode E_12 and the second reading unit Rx2 reads the active stylus sensing value AP_13 from the second electrode E_13. Further, the processing unit 624 stores the non-active stylus sensing value NP_12 and the active stylus sensing value AP_13 obtained during the first sub-frame period t_s1 to the memory unit 626.

In steps S704 to S718, the steps of converting the driving configuration during the second sub-frame period t_s2 and the third sub-frame period t_s3, providing the driving signal and reading sensing values according to the operational configuration of the first electrode E_11, second electrode E_12 and the third electrode E_13 are similar to that of steps S404 to S418 of FIG. 4, so it is omitted hereinafter.

After the third sub-frame period t_s3 is ended, the processing unit 624 determines that the first frame period t_1 is ended, thereby reading and integrating the sub-frame sensing values (including the non-active stylus sensing values NP_11 to NP_13 and the active stylus sensing values AP_11 to AP_13) from each of the sub-frame periods t_s₁ to t_s3, so that a touch information of the touch panel 110 during the first frame period t_1 may be obtained (step S720). Further, the processing unit 624 may further read the active stylus sensing values AP_11 to AP_13 with the specific frequency, so that the touch-sensing device 600 may further distinguish a touch information generated by the active stylus from a touch information generated by the non-the active stylus.

Figure 9:
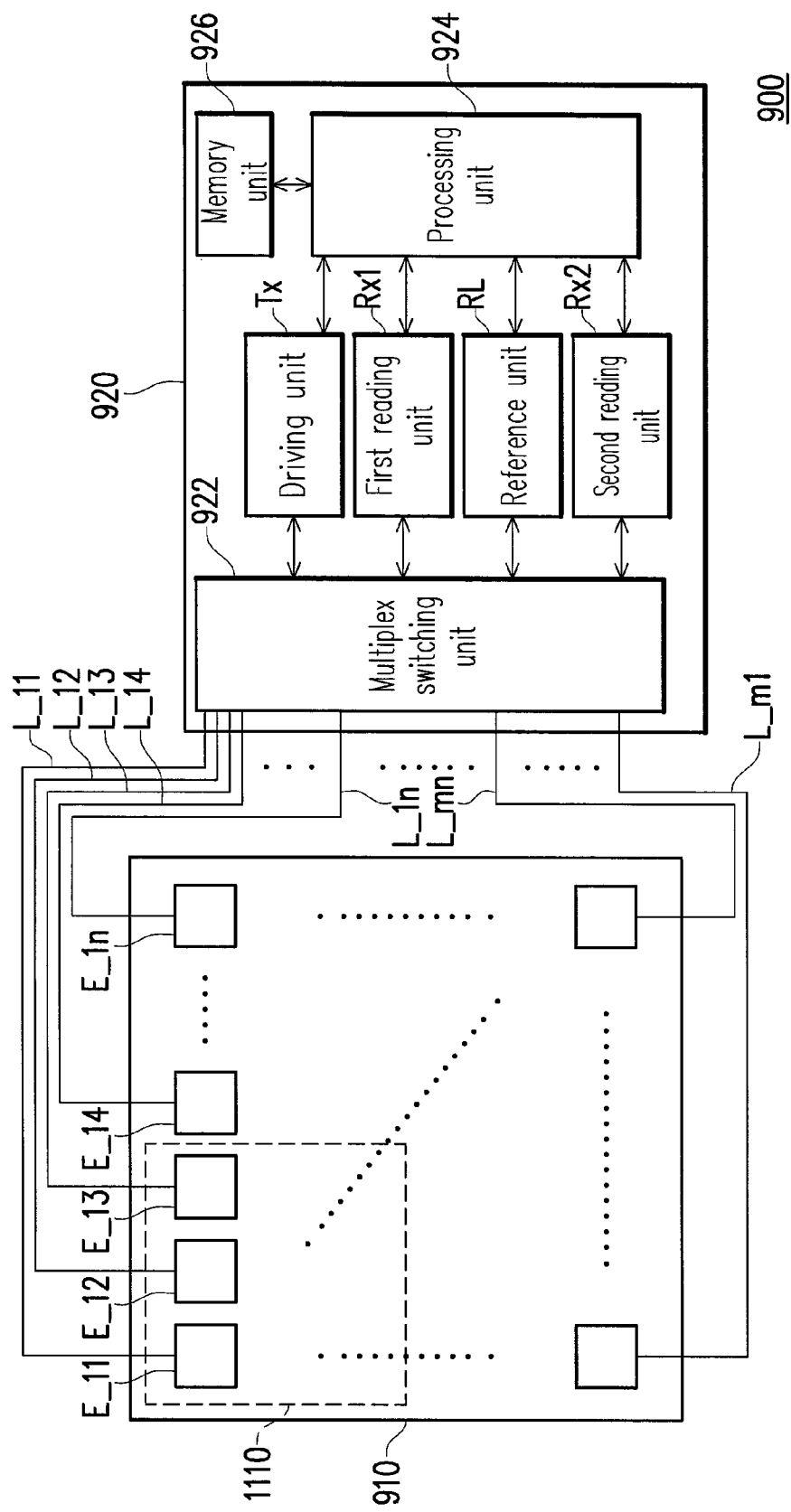
FIG. 9 is a schematic view illustrating a touch-sensing device 900 according to yet another embodiment of the invention.

FIG. 9 is a schematic view illustrating a touch-sensing device 900 according to yet another embodiment of the invention. In the present embodiment, the touch-sensing device 900 further integrates the functions of the touch-sensing device 300 of FIG. 3 and the touch-sensing device 600 of FIG. 6 by adding the shielding effect of the touch-sensing device 300 to the touch-sensing device 600 that is capable of sensing the active stylus.

Referring FIG. 9, the touch-sensing device 900 includes a touch panel 910 and a driving circuit 920. In comparing to aforesaid touch panel 110, the electrodes E_11 to E_mn of the touch panel 910 includes at least four electrodes having different operational configurations, for example, a first electrode E_11, a second electrode E_12, a third electrode E_13 and a fourth electrode E_14 which are adjacent to each other. In which, the structure of the touch panel 910 is the same to that of the touch panel 110 in the previous embodiment, so it is omitted hereinafter.

In the present embodiment, the driving circuit 920 includes a multiplex switching unit 922, a driving unit Tx, a first reading unit Rx1, a second reading unit Rx2, a processing unit 924 and a memory unit 926. In which, the driving unit Tx is coupled to the multiplex switching unit 922 for providing a driving signal s_d to the electrodes having a first operational configuration T via the multiplex switching unit 922. The first reading unit Rx1 is coupled to the multiplex switching unit 922 for reading the non-active stylus sensing values NP_11 to NP_nm from the electrodes having a second operational configuration via the multiplex switching unit 922. The reference unit RL is coupled to the multiplex switching unit 922 for providing a shield potential GND to the electrodes having the third operational configuration via the multiplex switching unit 322. The second reading unit Rx2 is coupled to the multiplex switching unit 622 for reading the active stylus sensing values AP_11 to AP_nm from the electrodes having a fourth operational configuration via the multiplex switching unit 622. In other words, the function of each unit in the present embodiment is similar to that of each unit of FIG. 3 and FIG. 6.

Figure 10:
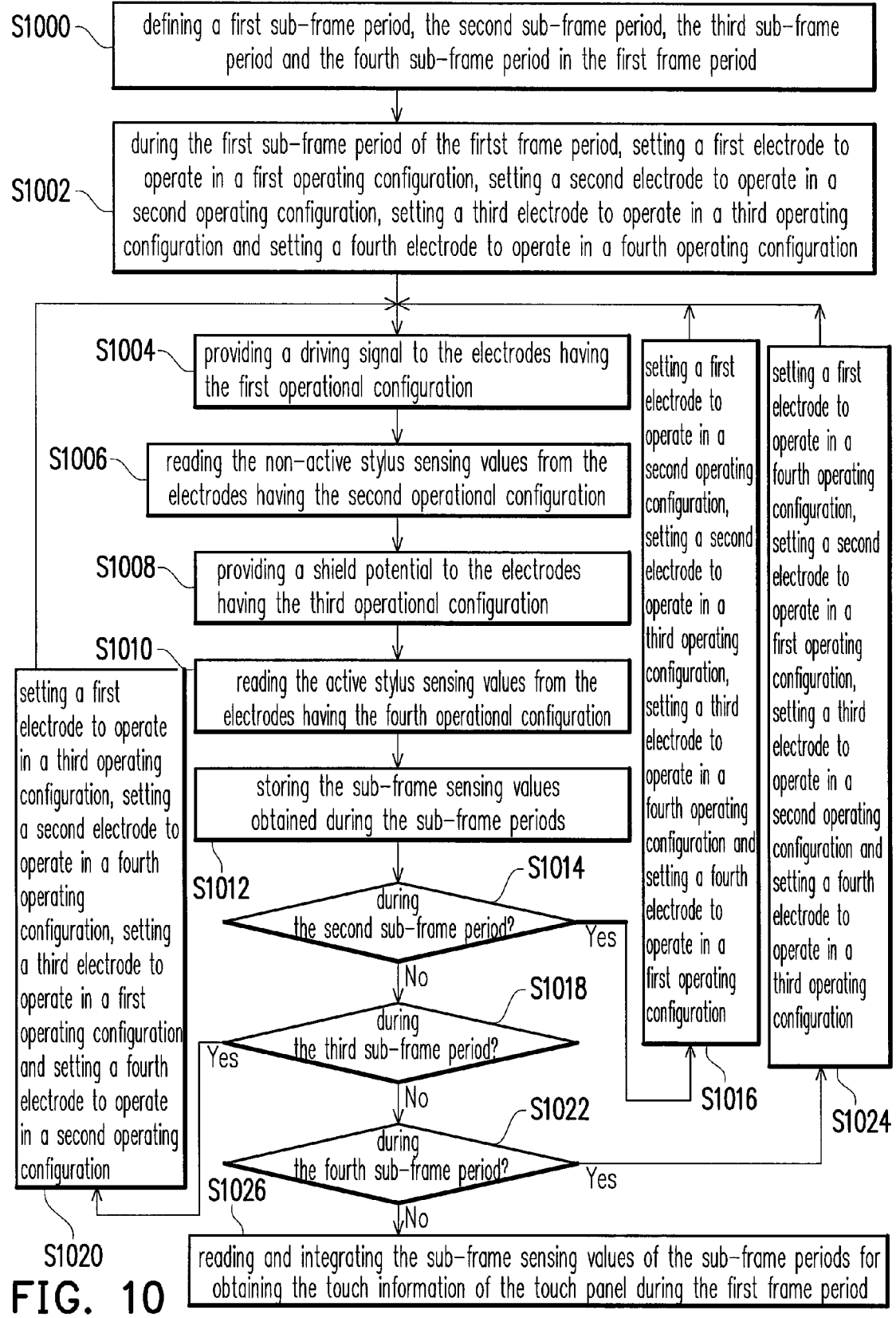
FIG. 10 is a schematic flowchart illustrating a driving method for a touch panel of FIG. 9.
Figure 11:
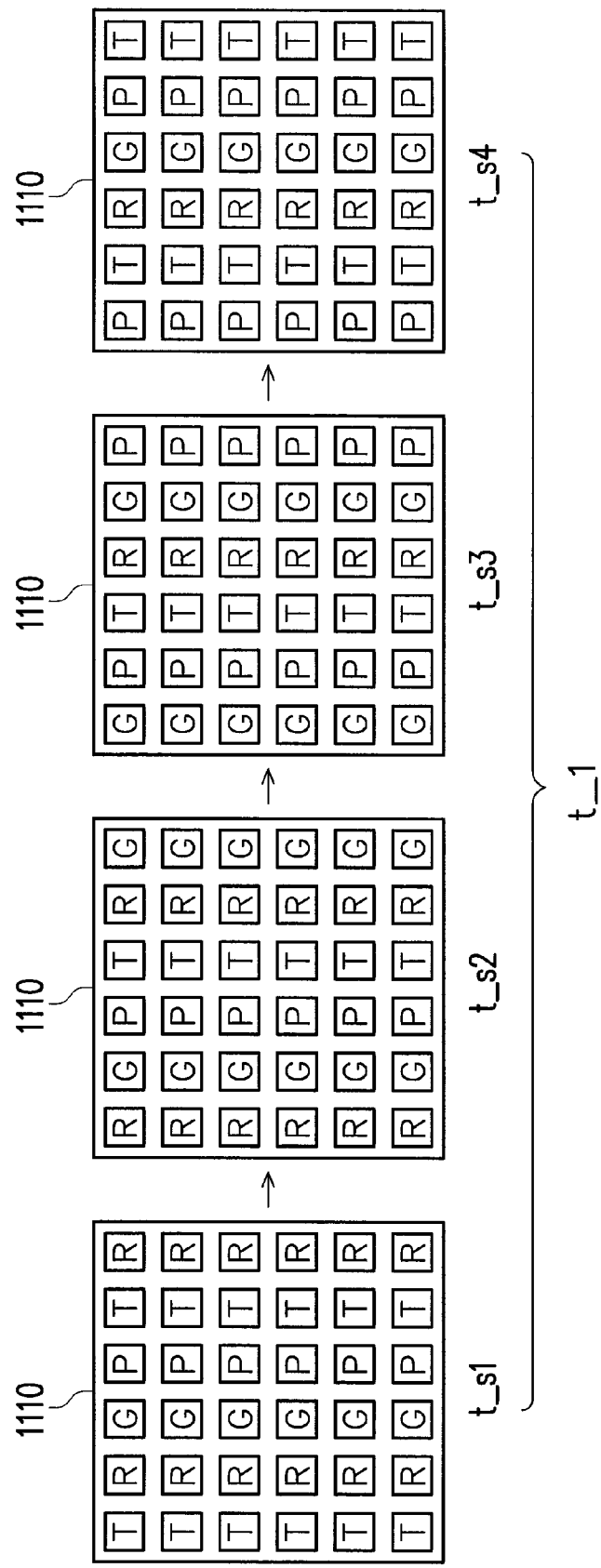
FIG. 11 is a schematic view illustrating an operation of a touch block 1110 during a first frame period of FIG. 9.

Referring to FIG. 9, FIG. 10 and FIG. 11 together for further description of the operation of the touch-sensing device 900 in the embodiment of the invention. In which, FIG. 10 is a schematic flowchart illustrating a driving method for a touch panel of FIG. 9. FIG. 11 is a schematic view illustrating an operation of a touch panel during a first frame period t_1 of FIG. 9.

Further, in order to simplify the description of the driving method of the touch panel 910, FIG. 11 is exemplified selecting a touch block 1110 of the touch panel 910, in which the first electrode E_11, the second electrode E_12, the third electrode E_13 and the fourth electrode E_14 are adjacent to each other and having different operational configurations.

In FIGS. 9 and 10, the touch panel 910 is driven by the driving circuit 920 using four units which have different functions, including the driving unit Tx, the first reading unit Rx1, the reference unit RL and the second reading unit Rx2. Therefore, the driving circuit 920 may respectively define four sub-frame periods in the first frame period t_1, including a first sub-frame period t_s1, the second sub-frame period t_s2, the third sub-frame period t_s3 and the fourth sub-frame period t_s4 (step S1000). In which, the specific implementation of defining the sub-frame periods within the first frame period by driving circuit 920 may be referred to the related description for defining the sub-frame periods by the drive circuit 120 in step S200 of the embodiment as shown in FIG. 1b, so it is omitted hereinafter.

After each of the sub-frame periods is defined, the processing unit 924 may set the first electrode E_11, the second electrode E_12, the third electrode E_13 and the fourth electrode E_14 to operate in the first operational configuration T, the second operational configuration R, the third operational configuration G and the fourth operational configuration P via the multiplex switching unit 622 during the first sub-frame period t_s1 of the first frame period t_1, respectively (step S1002).

During the first sub-frame period t_s1, the driving unit Tx of the driving circuit 920 provides a driving signal s_d to the electrodes having the first operational configuration T (step S1004); the first reading unit Rx1 reads the non-active stylus sensing values from electrodes having the second operational configuration R (step S1006); the reference unit RL provides the shield potential GND to the electrodes having the third operational configuration G (step S1008); and the second reading unit Rx2 reads the active stylus sensing values from the electrodes having the fourth operational configuration P (step S1010).

Next, the processing unit 924 receives the non-active stylus sensing values and the active stylus sensing values respectively obtained from the first reading unit Rx1 and the second reading unit Rx2 during the first sub-frame period t_s1, and stores the non-active stylus sensing values obtained to the memory unit 926 (step S1012). In other words, the processing unit 924 stores the sub-frame sensing values obtained during the sub-frame period in step S1012.

During the first sub-frame period t_s1, the first electrode E_11, the second electrode E_12, the third electrode E_13 and the fourth electrode E_14 are respectively having the first operational configuration T, the second operational configuration R, the third operational configuration G and the fourth operational configuration P. Therefore, during the first sub-frame period t_s1, the driving unit Tx provides the driving signal s_d to the first electrode E_11, the first reading unit Rx1 reads the non-active stylus sensing value NP_12 from the second electrode E_12, the reference unit RL provides the shield potential GND to the third electrode E_13 and the second reading unit Rx2 reads the active stylus sensing value AP_14 from the fourth electrode E_14. Further, during the first sub-frame period t_s1, the processing unit 924 stores the non-active stylus sensing value NP_12 and the active stylus sensing value AP_14 obtained during the first sub-frame period t_s1 to the memory unit 926.

After steps S1004 to S1012 are completed (i.e., when the first sub-frame period t_s1 is ended), the driving sequence of the touch panel 910 is switched to the second sub-frame period t_s2. Therefore, the processing unit 924 determines that the current sequence is at the second sub-frame period t_s2 and further controls the multiplex switching unit 922 to convert the driving configuration (step S1014). As a result, the first electrode E_11, the second electrode E_12, the third electrode E_13 and the fourth electrode E_14 are set to operate in the second operational configuration R, the third operational configuration G, the first operational configuration T and the fourth operational configuration P, respectively (step S1016). Next, steps S1004 to S1012 may then be performed.

In the present embodiment, during the second sub-frame period t_s2, the driving unit Tx provides the driving signal s_d to the fourth electrode E_14, the first reading unit Rx1 reads the non-active stylus sensing value NP_11 from the first electrode E_11, the reference unit RL provides the shield potential GND to the second electrode E_12 and the second reading unit Rx2 reads the active stylus sensing value AP_13 from the third electrode E_13. Further, during the second sub-frame period t_s2, the processing unit 924 stores the non-active stylus sensing value NP_11 and the active stylus sensing value AP_13 obtained during the second sub-frame period t_s2 to the memory unit 926.

When the second sub-frame period t_s2 is ended, the driving sequence of the touch panel 910 is switched to the third sub-frame period t_s3. Therefore, the processing unit 924 determines the current sequence is at the third sub-frame period t_s3 and further controls the multiplex switching unit 922 to convert the driving configuration (step S1018). As a result, the first electrode E_11, the second electrode E_12, the third electrode E_13 and the fourth electrode E_14 are set to operate in the third operational configuration G, the fourth operational configuration P, the first operational configuration T and the second operational configuration R, respectively (step S1020). Next, steps S1004 to S1012 may then be performed.

During the third sub-frame period t_s3, the driving unit Tx provides the driving signal s_d to the third electrode E_13, the first reading unit Rx1 reads the non-active stylus sensing value NP_14 from the fourth electrode E_14, the reference unit RL provides the shield potential GND to the first electrode E_11 and the second reading unit Rx2 reads the active stylus sensing value AP_12 from the second electrode E_12. Further, during the third sub-frame period t_s3, the processing unit 924 stores the non-active stylus sensing value NP_14 and the active stylus sensing value AP_12 obtained during the third sub-frame period t_s3 to the memory unit 926.

When the third sub-frame period t_s3 is ended, the driving sequence of the touch panel 910 is switched to the fourth sub-frame period t_s4. Therefore, the processing unit 924 determines that the current sequence is at the fourth sub-frame period t_s3 and further controls the multiplex switching unit 922 to convert the driving configuration (step S1022). As a result, the first electrode E_11, the second electrode E_12, the third electrode E_13 and the fourth electrode E_14 are set to operate in the fourth operational configuration P, the first operational configuration T, the second operational configuration R and the third operational configuration G, respectively (step S1024). Next, steps S1004 to S1012 may then be performed.

During the fourth sub-frame period t_s4, the driving unit Tx provides the driving signal s_d to the second electrode E_12, the first reading unit Rx1 reads the non-active stylus sensing value NP_13 from the third electrode E_13, the reference unit RL provides the shield potential GND to the fourth electrode E_14 and the second reading unit Rx2 reads the active stylus sensing value AP_11 from the first electrode E_11. Further, during the fourth sub-frame period t_s4, the processing unit 924 stores the non-active stylus sensing value NP_13 and the active stylus sensing value AP_11 obtained during the fourth sub-frame period t_s4 to the memory unit 926.

After the fourth sub-frame period t_s4 is ended, the processing unit 924 determines that the first frame period t_1 is ended, thereby reading and integrating the sub-frame sensing values (including the non-active stylus sensing values NP_11 to NP_14 and the active stylus sensing values AP_11 to AP_14) from each of the sub-frame periods t_s1 to t_s4, so that a touch information of the touch panel 910 during the first frame period t_1 may be obtained (step S1026). Further, by reading the active stylus sensing values AP_11 to AP_14 with the specific frequency, the touch-sensing device 600 may further distinguish a touch information generated by the active stylus from a touch information generated by the non-the active stylus. In addition, since the shield potential GND is provided, the first electrode E_11, the second electrode E_12, the third electrode E_13 and the fourth electrode E_14 during the first frame period t_1 may equivalently have a shielding effect from using the method of time division multiplexing.

Figure 12:
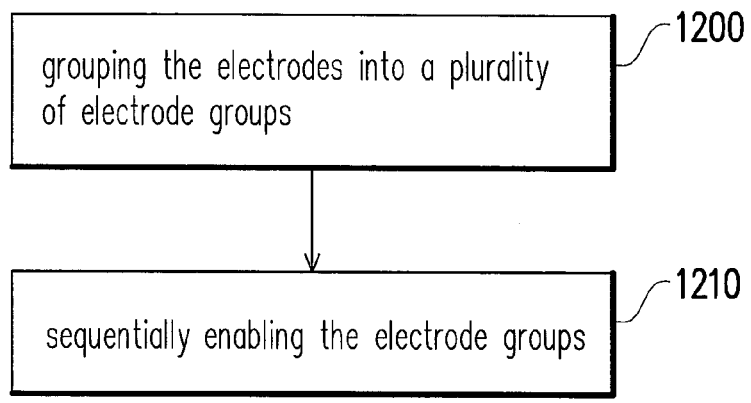
FIG. 12 is a schematic flowchart illustrating a driving method for a touch panel according to another embodiment of the invention.

Since the touch-sensing device using said driving method requires constantly switching of the driving configurations between a plurality of sub-frame periods, another driving method for the touch panel is further provided to reduce the power dissipation of the touch-sensing device, as shown in FIG. 12. In which, FIG. 12 is a schematic flowchart illustrating a driving method for a touch panel according to another embodiment of the invention.

Referring to FIG. 12, the driving method of the present embodiment includes grouping the electrodes on the touch panel into a plurality of electrode groups (step S1200), and sequentially enabling at least one of the electrode groups (step S1210). In which, the driving method of the present embodiment may be applied to any of aforesaid touch-sensing devices and driving methods. That is, when the touch-sensing device sequentially enables the electrode groups, the electrodes within the enabled electrode groups are respectively driven according to aforesaid driving method to output corresponding sensing values.

Figure 13:
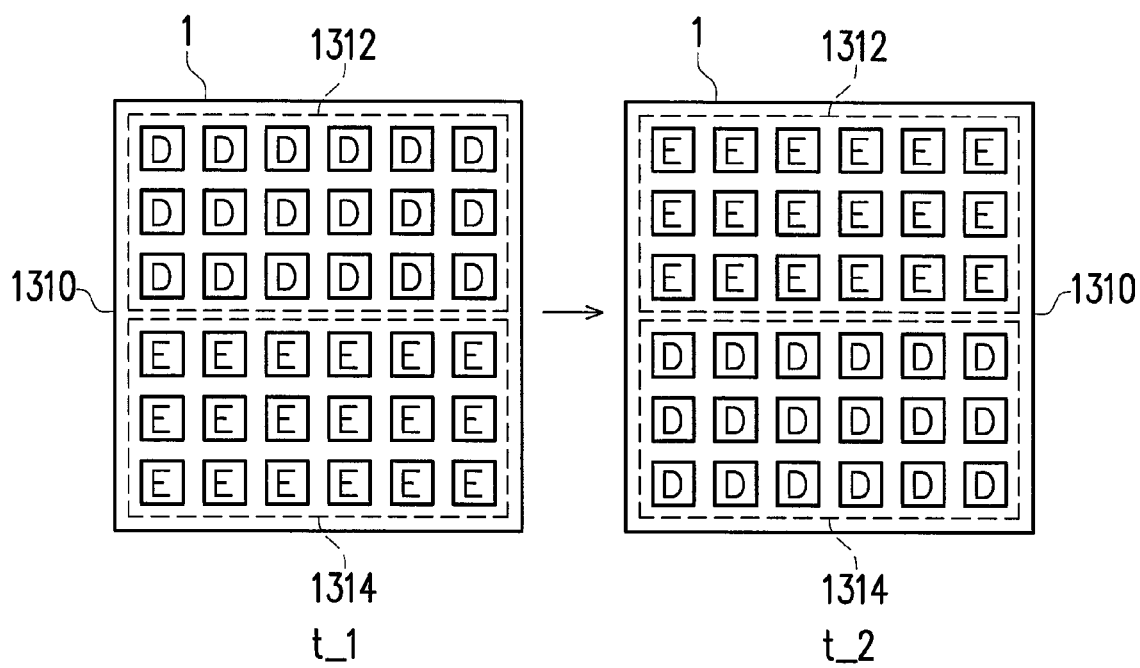
FIG. 13 is a schematic view illustrating an operation of a touch block 1310 using the driving method of FIG. 12.

FIG. 13 is a schematic view illustrating an operation of a touch block 1310 using the driving method of FIG. 12. The driving method of the present embodiment is exemplified using the touch block 1310 which has the same structure to the touch block 510. Referring to FIG. 13, the driving circuit may group the touch block 1310 into electrode groups 1312 and 1314. In the step of sequentially enabling the electrode groups, the driving circuit disables the electrode group 1312 during the first frame period t_1, so that each electrode within the electrode group 1312 is in a disabled state D for turning off or biasing to the ground voltage. Accordingly, the driving circuit simultaneously enables the electrode group 1314 during the first frame period t_1, so that each electrode within the electrode group 1314 is in an enabled state E. As a result, the driving circuit may drive each electrode within the electrode group 1314 according to any one of aforesaid driving methods to obtain sensing value of each electrode within the electrode group 1314 during the first frame period t_1.

After the first frame period t_1 is ended, the driving circuit enables the electrode group 1312 during the second frame period t_2, so that each electrode within the electrode group 1312 is converted to the enabled state E. As a result, the driving circuit may drive each electrode within the electrode group 1312 according to any one of aforesaid driving methods to obtain the sensing value of each electrode within the electrode group 1312 during the second frame period t_2. Accordingly, the driving circuit simultaneously disables the electrode group 1314 during the second frame period t_2, so that each electrode within the electrode group 1314 is converted to the disabled state D for turning off or biasing to the ground voltage. Based on above, the driving circuit may generate a complete touch information according to the sensing values read during the first frame period and the second frame period t_2.

In view of above, the driving method of the present embodiment may reduce the number of channels and dimensions used by the driving circuit by grouping the touch panel into a plurality of electrode groups and sequentially driving each of the electrode groups, thereby reducing power dissipation when driving the touch panel.

It should be noted that, the grouping method of said electrode groups 1312 and 1314 is merely an example. Since the touch panel of the present embodiment is driven by using independently wiring to the driving circuit, the driving circuit may group the electrode groups in various aspects. As an example for the touch block 1310, the driving circuit may implement said driving method by grouping the touch block 1310 with methods of grouping every two rows of electrodes into one electrode group, grouping every two columns of electrodes into one electrode group or grouping every 3×3 block of the electrodes into one electrode group, the invention is not limited thereto.

Figure 14:
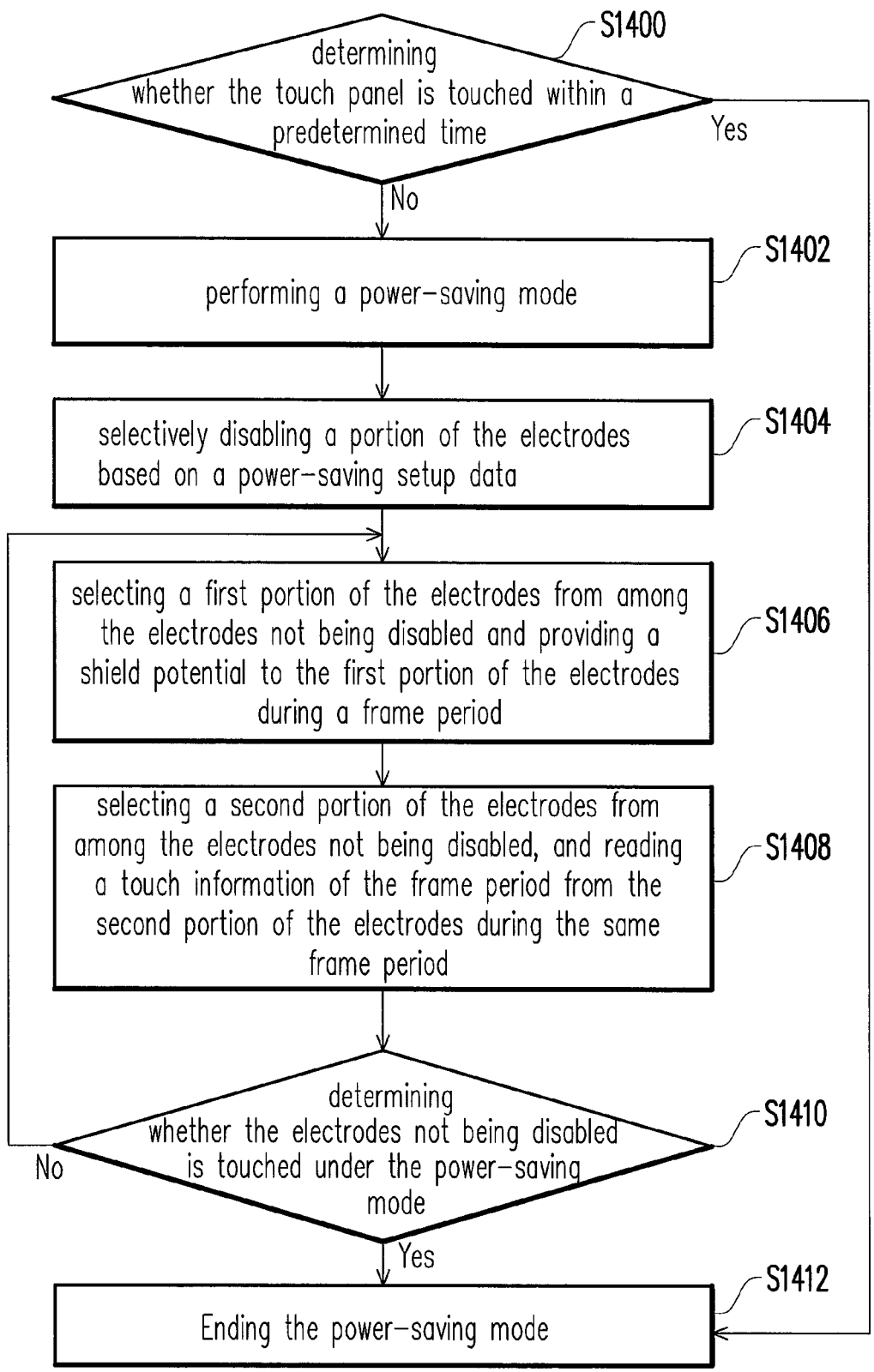
FIG. 14 is a schematic flowchart illustrating a driving method for a touch panel according to yet another embodiment of the invention.

In addition, the invention further provides a driving method for touch panel having power-saving mode, as shown in FIG. 14. In which, FIG. 14 is a schematic flowchart illustrating a driving method for a touch panel according to another embodiment of the invention.

In the present embodiment, the driving method of said touch panel may also be applied to any touch-sensing devices and driving methods, including aforesaid touch-sensing devices and driving methods. Referring to FIG. 14, firstly, the driving circuit determines whether the touch panel is touched within a predetermined time (step S1400). The driving circuit performs a power-saving mode if the driving circuit determines that the touch panel is not touched within the predetermined time (step S1402). In this case, the driving circuit loads a power-saving setup data from an external host and selectively disables a portion of the electrodes based on the power-saving setup data (step S1404). Although it is exemplified herein with "determining whether to perform a power-saving mode according to whether the touch panel is touched within a predetermined time" as an example, the invention is not limited thereto. Regardless which method (such as "determining by whether it is touched within a predetermined time", "determining by the user to enter the power saving mode" or "automatically entering the power-saving mode when a specific program is executed") is applied for performing the power-saving mode, it is in the scope of the invention as long as the device using said driving method has a power-saving mode. In addition, although it is exemplified with "loading a power-saving setup data from an external host" as an example, the invention is not limited thereto. It is in the scope of the invention regardless of which storing device is the power-saving mode read or dramatically generated from.

Under the power-saving mode, the driving circuit selects a first portion of the electrodes from among the electrodes not being disabled and provides a shield potential to the first portion of the electrodes during a frame period (step S1406). Further, the driving circuit selects a second portion of the electrodes from among the electrodes not being disabled, and reads a touch information of the frame period from the second portion of the electrodes during the same frame period (step S1408).

Next, the driving circuit determines whether the electrodes not being disabled is touched under the power-saving mode (step S1410). If the driving circuit determines that the electrode not being disabled is not touched, steps S1406 and S1408 are repeated to provide the shield potential and read the touch information, and the driving circuit determines whether the electrodes not being disabled is touch again. The power-saving mode is ended when the driving circuit determines that the electrodes not being disabled is touched (step S1412). In addition, the process of said driving method is merely an example. In other embodiments, if the driving circuit determines that the electrode not being disabled is not touched in step S1410, the process of the driving method may also return back to step S1404 which selects a different portion of the electrodes for providing the shield potential and reading the touch information, the invention is not limited thereto.

Figure 15:
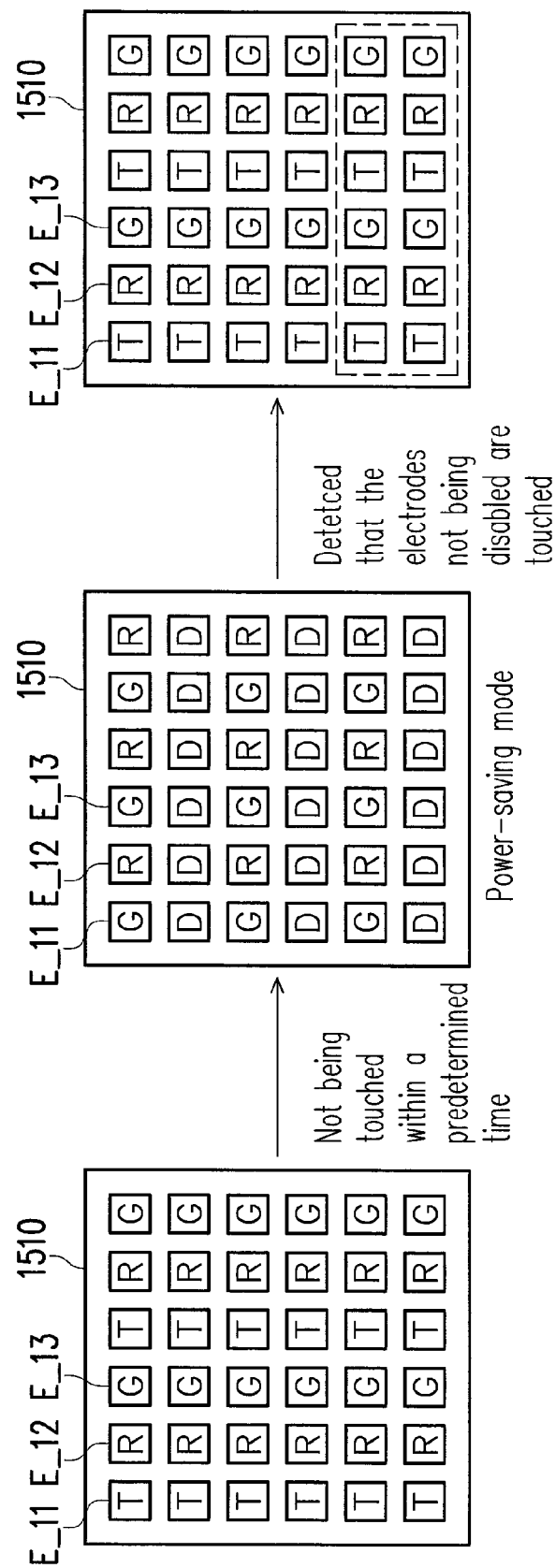
FIG. 15 is a schematic view illustrating an operation of a touch block 1510 using the driving method of FIG. 14 according to an embodiment of the invention.

More specifically, FIG. 15 is a schematic view illustrating an operation of a touch block 1510 using the driving method of FIG. 14 according to an embodiment. The driving method of the present embodiment is also exemplified using the touch block 1510 which has the same structure to the touch block 510. Referring to FIG. 15, the touch-sensing device drives the touch panel according to the driving method when it is in a normal operation mode, it is exemplified hereinafter with driving the touch panel of FIG. 3. Under the normal operation mode, the touch block 1510 switches the first operational configuration T, the second operational configuration R and the third operational configuration G between each of the sub-frame periods. When the driving circuit controls the touch-sensing device to perform the power-saving mode, most of electrodes within the touch panel are disabled so that a portion of the electrodes within the touch block 1510 is in the disabled state.

More specifically, in an embodiment, the driving circuit under the power-saving mode selects a first portion of the electrodes from among the electrodes not being disabled within the odd-numbered columns (e.g., the electrodes within the odd-numbered rows) and sets the first portion of the electrodes to the third operational configuration G for receiving the shield potentials provided by the driving circuit. Next, the driving circuit under the power-saving mode selects a second portion of the electrodes (e.g., the electrodes within the even-numbered rows) and sets the second portion of the electrodes to the second operational configuration R for outputting the sensing values to the driving circuit. In other words, under the power-saving mode, the driving circuit may read the sensing values from the electrodes by using a method similar to self-capacitance. Therefore, in comparing to driving under normal operation mode, besides that the power dissipation of the touch-sensing device may be reduced by disabling a portion of the electrodes under the power-saving mode, the power dissipation while driving the touch-sensing device may also be further reduced by driving the touch-sensing panel using a sensing method of self-capacitance instead of providing the driving signals.

Figure 16:
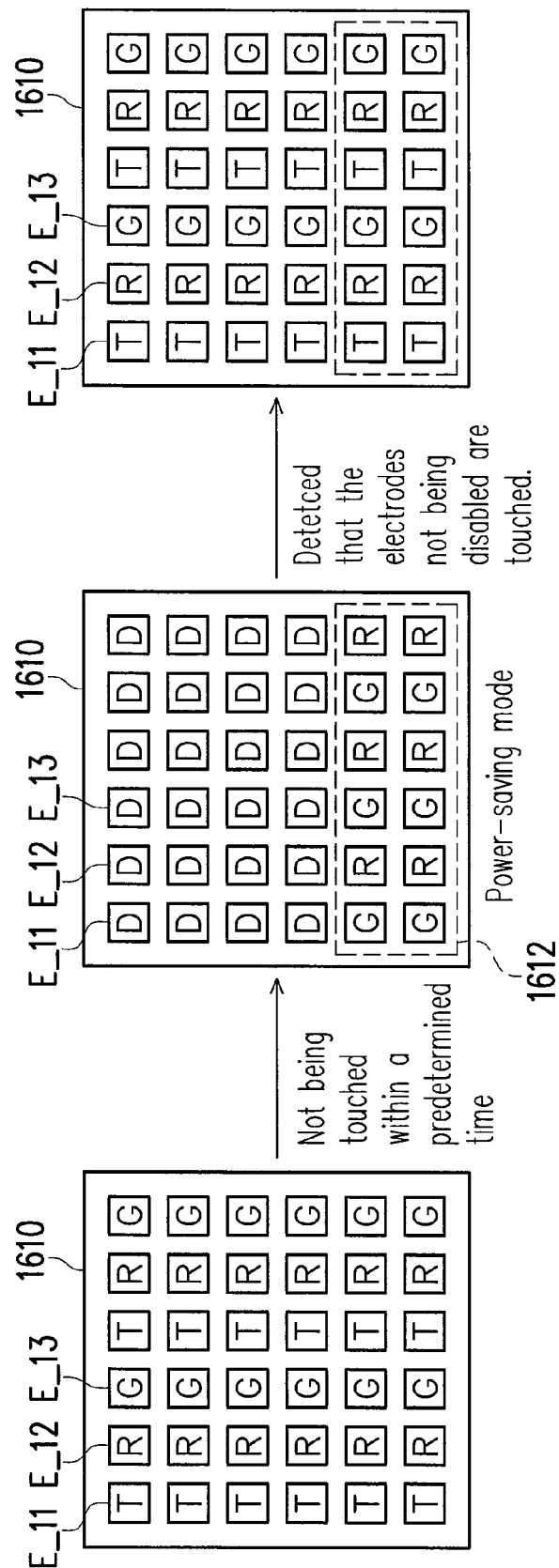
FIG. 16 is a schematic view illustrating an operation of a touch block 1610 using the driving method of FIG. 14 according to another embodiment of the invention.
Figure 17:
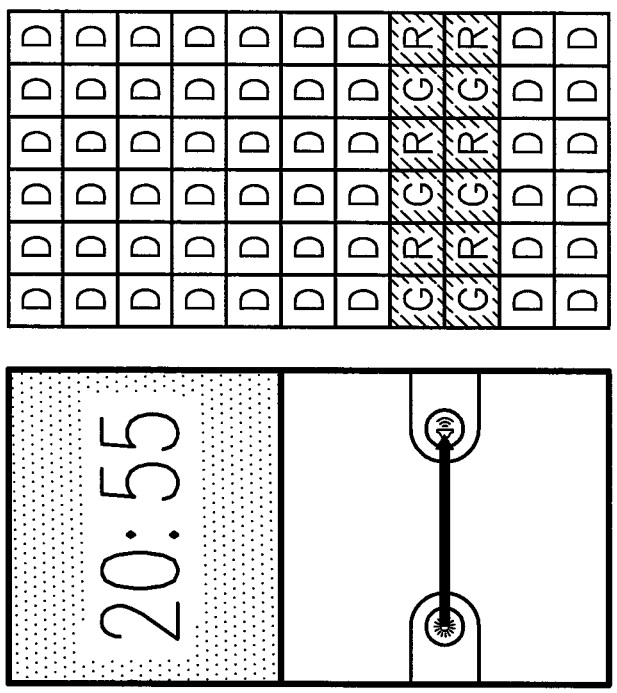
FIG. 17 is a screen displayed under a screen saver mode of the touch panel according to an embodiment of the invention.

Referring to FIG. 16, which illustrates an operation of a touch block using the driving method of FIG. 14 according to another embodiment of the invention. The driving method of the present embodiment is also exemplified using the touch block 1610 which has the same structure to the touch block 510. Referring to FIG. 17, which illustrates a screen displayed under a screen saver mode of the touch panel. In the present embodiment, since detecting input signals from other area besides the unlocking area are no required under screen saver mode, a power saving effect may be achieved by disabling the electrode within other areas when the touch-sensing device under the screen saver mode.

That is, an active area (i.e., the area of the electrodes not being disabled) of the touch-sensing device under the power-saving mode may be defined based on practical uses. The shape and the position of the active area may be defined according to the setup of the application, for example, a specific touch area within the touch panel that is a round shape or a strip shape. In other words, when the touch-sensing device under the power-saving mode reads the power-saving setup data, said power-saving setup data may relate to a screen displayed by an application in a specific mode such as an unlocking screen displayed when the screen saver mode is activated. Or, an area that is not required to receive touch signal within the screen displayed by a specific application may be displayed. As a result, the power-saving setup data may set the electrodes within the area that is not required to receive touch signal to a disabled state.

In the present embodiment, the electrode group 1612 within the touch block 1610 is referred to as the electrodes not being disabled, whereas the other areas within the touch block 1610 are referred as the electrodes being disabled. In which, the driving circuit provides the shield potential to the electrodes within the odd-numbered rows of the electrode group 1612 and reads touch information from the electrodes within the even-numbered rows of the electrode group 1612 for continuously detecting whether to end the power-saving mode. In other words, the method that is similar to self-capacitance is also used herein for reading the sensing values from the electrodes. As a result, the touch-sensing device may further reduce the power dissipation by disabling most of the electrodes. In view of above, the driving method of the touch panel and the touch-sensing device thereof in the embodiments of the invention may convert a driving configuration of the touch panel during a plurality of the sub-frame periods, so that a shielding effect may be provided to the touch panel equivalently during each of the frame periods by using the method of time division multiplexing, thereby increasing the noise isolation of the touch-sensing device while optimizing the size of the touch-sensing device. Also, the equivalent sensing pitch of each electrode within the touch panel may also be reduced by using said driving method so that the touch sensitiveness of the touch panel may be increased. In which, a sensing mechanism of the active stylus is added to the touch-sensing device according to said driving method. In addition, the touch-sensing device may determine whether to drive using a method for the power-saving mode according to the touch status of the touch panel, so as to reduce the power dissipation of the touch panel.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed:

1. A driving method for a touch panel having a plurality of electrodes, wherein the electrodes are coupled to a driving circuit respectively via different electrical paths, the driving method for the touch panel comprises:
    defining a plurality of sub-frame periods in a first frame period;
    converting a driving configuration for providing the driving configuration that is different from each other respectively to each of the sub-frame periods, wherein the driving configuration comprises corresponding relations of a first electrode, a second electrode and a third electrode among the electrodes which are respectively corresponding to a first operational configuration, a second operational configuration and a third operational configuration;
    providing a driving signal from the driving circuit to the electrodes having the first operational configuration during one of the sub-frame periods;
    reading sub-frame sensing values by the driving circuit from the electrodes having the second operational configuration during the same one of the sub-frame periods; and
    providing a shield potential from the driving circuit to the electrodes having the third operational configuration during the same one of the sub-frame periods; and
    integrating the sub-frame sensing values respectively obtained during the sub-frame periods by the driving circuit for obtaining a touch information of the touch panel during the first frame period.

2. The driving method for the touch panel of claim 1, wherein the first electrode, the second electrode and the third electrode are adjacent to each other.

3. The driving method for the touch panel of claim 1, wherein the step of converting the driving configuration comprises:
    during a first sub-frame period of the first frame period, setting the first electrode to operate in the first operational configuration, setting the second electrode to operate in the second operational configuration and setting the third electrode to operate in the third operational configuration;
    during a second sub-frame period of the first frame period, setting the first electrode to operate in the second operational configuration, setting the second electrode to operate in the third operational configuration and setting the third electrode to operate in the first operational configuration; and
    during a third sub-frame period of the first frame period, setting the first electrode to operate in the third operational configuration, setting the second electrode to operate in the first operational configuration and setting the third electrode to operate in the second operational configuration.

4. The driving method for the touch panel of claim 1, wherein the step of integrating the sub-frame sensing values respectively obtained during the sub-frame periods comprises:
    storing the sub-frame sensing values obtained during the sub-frame periods; and
    reading and integrating the sub-frame sensing values of the sub-frame periods for obtaining the touch information of the touch panel during the first frame period when the first frame period is ended.

5. The driving method for the touch panel of claim 1, wherein the shield potential is a ground voltage.

6. The driving method for the touch panel of claim 1, wherein the sub-frame sensing values comprise an active stylus sensing value and a non-active stylus sensing value, and the step of driving the electrodes with the driving configuration during the sub-frame periods comprises:
    providing a driving signal from the driving circuit to the electrodes having the first operational configuration;
    reading the non-active stylus sensing values by the driving circuit from the electrodes having the second operational configuration; and
    reading the active stylus sensing values by the driving circuit from the electrodes having the third operational configuration, wherein the active stylus sensing values have a specific frequency.

7. A driving method for the touch panel having a plurality of electrodes, wherein the electrodes are coupled to a driving circuit respectively via different electrical paths, the driving method for the touch panel comprises:
    defining a plurality of sub-frame periods in a first frame period;
    converting a driving configuration for providing the driving configuration that is different from each other respectively to each of the sub-frame periods, wherein the driving configuration comprises corresponding relations of a first electrode, a second electrode, a third electrode and a fourth electrode among the electrodes which are respectively corresponding to a first operational configuration, a second operational configuration, a third operational configuration and a fourth operational configuration;
    providing a driving signal from the driving circuit to the electrodes having the first operational configuration;
    reading a non-active stylus sensing values by the driving circuit from the electrodes having the second operational configuration;
    providing a shield potential from the driving circuit to the electrodes having the third operational configuration; and
    reading an active stylus sensing values by the driving circuit from the electrodes having the fourth operational configuration, wherein the active stylus sensing value has a specific frequency; and integrating the sub-frame sensing values respectively obtained during the sub-frame periods by the driving circuit for obtaining a touch information of the touch panel during the first frame period, wherein the sub-frame sensing values comprise the active stylus sensing value and the non-active stylus sensing value.

8. A touch-sensing device, comprising:
a touch panel having a plurality of electrodes, wherein the electrodes at least comprise a first electrode, a second electrode and a third electrode; and
a driving circuit, electrically connected to the touch panel, wherein the electrodes are coupled to the driving circuit respectively via different electrical paths; the driving circuit defines a plurality of sub-frame periods in a first frame period; the driving circuit converts a driving configuration for providing the driving configuration that is different from each other respectively to each of the sub-frame periods, wherein the driving configuration comprises corresponding relations of the first, the second and the third electrodes that are respectively corresponding to a first operational configuration, a second operational configuration and a third operational configuration; the driving circuit provides a driving signal to the electrodes having the first operational configuration during one of the sub-frame periods; the driving circuit reads the sub-frame sensing values from the electrodes having the second operational configuration during the same one of the sub-frame periods; the driving circuit provides a shield potential to the electrodes having the third operational configuration during the same one of the sub-frame periods; and the driving circuit integrates the sub-frame sensing values respectively obtained during the sub-frame periods for obtaining a touch information of the touch panel during the first frame period.

9. The touch-sensing device of claim 8, wherein the first electrode, the second electrode and the third electrode are adjacent to each other.

10. The touch-sensing device of claim 8, wherein during a first sub-frame period of the first frame period, the driving circuit sets the first electrode to operate in the first operational configuration, sets the second electrode to operate in the second operational configuration and sets the third electrode to operate in the third operational configuration; during a second sub-frame period of the first frame period, the driving circuit sets the first electrode to operate in the second operational configuration, sets the second electrode to operate in the third operational configuration and sets the third electrode to operate in the first operational configuration; and during a third sub-frame period of the first frame period, the driving circuit sets the first electrode to operate in the third operational configuration, sets the second electrode to operate in the first operational configuration and sets the third electrode to operate in the second operational configuration.

11. The touch-sensing device of claim 8, wherein the sub-frame sensing values comprise an active stylus sensing value and a non-active stylus sensing value; the driving circuit provides a driving signal to the electrodes having the first operational configuration; the driving circuit reads the non-active stylus sensing values from the electrodes having the second operational configuration; and the driving circuit reads the active stylus sensing values from the electrodes having the third operational configuration, wherein the active stylus sensing values have a specific frequency.

12. The touch-sensing device of claim 11, wherein the driving circuit comprises:

a multiplex switching unit, electrically connected to the electrodes of the touch panel, configured for converting the driving configuration;
a driving unit, coupled to the multiplex switching unit, configured for providing the driving signal to the electrodes having the first operational configuration through the multiplex switching unit;
a first reading unit, coupled to the multiplex switching unit, configured for reading the non-active stylus sensing values from the electrodes having the second operational configuration through the multiplex switching unit;
a second reading unit, coupled to the multiplex switching unit, configured for reading the active stylus sensing values from the electrodes having the third operational configuration through the multiplex switching unit;
a processing unit, electrically coupled to the multiplex switching unit, the driving circuit, the first reading unit and the second reading unit, configured for controlling the multiplex switching unit to convert the driving configuration, receiving and processing the non-active stylus sensing values provided by the first reading unit and the active stylus sensing values provided by the second reading unit, and integrating the sub-frame sensing values respectively obtained during the sub-frame periods for obtaining a touch information of the touch panel during the first frame period.

13. The touch-sensing device of claim 8, wherein the shield potential is a ground voltage.

14. The touch-sensing device of claim 8, wherein the driving circuit comprises:
a multiplex switching unit, electrically connected to the electrodes of the touch panel, configured for converting the driving configuration;
a driving unit, coupled to the multiplex switching unit, configured for providing the driving signal to the electrodes having the first operational configuration through the multiplex switching unit;
a first reading unit, coupled to the multiplex switching unit, configured for reading the sub-frame sensing values from the electrodes having the second operational configuration through the multiplex switching unit;
a reference unit, coupled to the multiplex switching unit, configured for providing the shield potential to the electrodes having the third operational configuration through the multiplex switching unit; and
a processing unit, electrically coupled to the multiplex switching unit, the driving circuit, the first reading unit and the reference unit, configured for controlling the multiplex switching unit to convert the driving configuration, receiving and processing the sub-frame sensing values provided by the first reading unit, and integrating the sub-frame sensing values respectively obtained during the sub-frame periods for obtaining a touch information of the touch panel during the first frame period.

15. The touch-sensing device of claim 14, wherein the driving circuit further comprises:
a memory unit, electrically connected to the processing unit, configured for storing the sub-frame sensing values obtained during the sub-frame periods.

16. A touch-sensing device, comprising:
a touch panel having a plurality of electrodes, wherein the electrodes at least comprises a first electrode, a second electrode, a third electrode and a fourth electrode; and
a driving circuit, electrically connected to the touch panel, wherein the electrodes are coupled to the driving circuit respectively via different electrical paths; the driving circuit defines a plurality of sub-frame periods in a first frame period; the driving circuit converts a driving configuration for providing the driving configuration that is different from each other respectively to each of the sub-frame periods, wherein the driving configuration comprises corresponding relations of the first, the second, the third and the fourth electrodes that respectively corresponding to a first operational configuration, a second operational configuration, a third operational configuration and a fourth operational configuration; the driving circuit provides a driving signal to the electrodes having the first operational configuration; the driving circuit reads a non-active stylus sensing values from the electrodes having the second operational configuration; the driving circuit provides a shield potential to the electrodes having the third operational configuration; and the driving circuit reads an active stylus sensing values from the electrodes having the fourth operational configuration; and the driving circuit integrates the sub-frame sensing values respectively obtained during the sub-frame periods for obtaining a touch information of the touch panel during the first frame period, wherein the active stylus sensing value has a specific frequency, and the sub-frame sensing values comprise the active stylus sensing value and the non-active stylus sensing value.

17. The touch-sensing device of claim 16, wherein the driving circuit comprises:
  a multiplex switching unit, electrically connected to the electrodes of the touch panel, configured for converting the driving configuration;
  a driving unit, coupled to the multiplex switching unit, configured for providing the driving signal to the electrodes having the first operational configuration through the multiplex switching unit;
  a first reading unit, coupled to the multiplex switching unit, configured for reading the non-active stylus sensing values from the electrodes having the second operational configuration through the multiplex switching unit;
  a reference unit, coupled to the multiplex switching unit, configured for providing the shield potential to the electrodes having the third operational configuration through the multiplex switching unit;
  a second reading unit, coupled to the multiplex switching unit, configured for reading the active stylus sensing values from the electrodes having the fourth operational configuration through the multiplex switching unit; and
  a processing unit, electrically coupled to the multiplex switching unit, the driving circuit, the first reading unit, the second reading unit and the reference unit, configured for controlling the multiplex switching unit to convert the driving configuration, receiving and processing the non-active stylus sensing values provided by the first reading unit and the active stylus sensing values provided by the second reading unit, and integrating the sub-frame sensing values respectively obtained during the sub-frame periods for obtaining a touch information of the touch panel during the first frame period.

* * * * *